(12) United States Patent
Dixon et al.

(10) Patent No.: US 11,644,595 B2
(45) Date of Patent: May 9, 2023

(54) GEOLOGIC FORMATION OPERATIONS FRAMEWORK

(71) Applicant: Schlumberger Technology Corporation, Sugar Land, TX (US)

(72) Inventors: Todd Christopher Dixon, Pune (IN); Ramchandra Nile, Pune (IN); Sanjeet Khanuja, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 357 days.

(21) Appl. No.: 16/947,026

(22) Filed: Jul. 15, 2020

(65) Prior Publication Data
US 2021/0026030 A1 Jan. 28, 2021

(30) Foreign Application Priority Data
Jul. 16, 2019 (IN) .............................. 201921028674

(51) Int. Cl.
*G01V 1/46* (2006.01)
*G01V 1/34* (2006.01)
*G01V 1/50* (2006.01)

(52) U.S. Cl.
CPC ................. *G01V 1/46* (2013.01); *G01V 1/34* (2013.01); *G01V 1/50* (2013.01)

(58) Field of Classification Search
CPC ............... G01V 1/46; G01V 1/34; G01V 1/50
See application file for complete search history.

(56) References Cited

U.S. PATENT DOCUMENTS

| | | | |
|---|---|---|---|
| 2014/0040058 A1* | 2/2014 | Aklian | G06Q 10/101 705/26.1 |
| 2018/0300576 A1* | 10/2018 | Dalyac | G06N 20/00 |
| 2020/0278471 A1* | 9/2020 | Dixon | G06F 16/9024 |
| 2021/0019350 A1* | 1/2021 | Dixon | G06Q 10/067 |
| 2021/0019351 A1* | 1/2021 | Dixon | G06F 16/9024 |
| 2021/0026030 A1* | 1/2021 | Dixon | G01V 1/46 |

FOREIGN PATENT DOCUMENTS

| | | | | |
|---|---|---|---|---|
| CA | 2880545 C | * | 12/2020 | ............. G06F 16/93 |
| WO | WO-2019055553 A1 | * | 3/2019 | ............... G01V 3/36 |

* cited by examiner

*Primary Examiner* — Daniel Pihulic
(74) *Attorney, Agent, or Firm* — Michael Guthrie

(57) ABSTRACT

A method can include receiving a selection for data via a graphical user interface rendered to a display; via the graphical user interface, initiating a data ingestion process for the selected data; via the graphical user interface, rendering data descriptors generated by the data ingestion process; via the graphical user interface, issuing a validation instruction that validates the data descriptors; and, via the graphical user interface, issuing an instruction that stores a data ingestion template that includes the validated data descriptors.

20 Claims, 25 Drawing Sheets

GUI 1200

Attribution Definition / Relationships

XX Attributes Detected – Define File Properties for Sections Below

Attributes

| Attribute | Preview | Type | Format | Unit System | Dimension | Unit |
|---|---|---|---|---|---|---|
| ☐ API | | | | | | |
| ☐ Basin | | | | | | |
| ☐ CompletionDate | | | | | | |
| ☐ MeasuredDepth | | | | | | |
| ☐ GroundElevation | | | | | | |
| ☐ Latitude | | | | | | |
| ☐ Longitude | | | | | | |
| ☐ BottomHolePressure | | | | | | |
| ☐ BottomHoleTemperature | | | | | | |
| ☐ Other | | | | | | |

Back  Next

Fig. 12

GUI 1300

Attribution Definition / Relationships

XX Attributes Detected – Define File Properties for Sections Below

| Attributes | ▷ | ▷ |
|---|---|---|
| Geo Location | | |

Attribute CRS     Axis
[NAD83 ▷]     [Lat/Long ▷]

Source Attribute
E/Latitude     Format
[Latitude ▷]     [DDD.DDD.HH ▷]

N/Longitude     Format
[Longitude ▷]     [DDD.DDD.HH ▷]

[Back]     [Next]

Fig. 13

GUI 1400

Attribution Definition / Relationships

XX Attributes Detected – Define File Properties for Sections Below

| Attributes | ▷ |
|---|---|
| Geo Location | ▷ |
| Relationships | ▷ |

Match From         Match To

Attribute          Source         Entity            Attribute

[Well ID ▷]        [PROSOURCE ▷]  [Wellbore ▷]      [Well ID ▷]

⊕ Add New Relationship

[Back]   [Next]

Fig. 14

Enrich & Visualize

Define Secondary Data Below

GUI 1500

| Enrichment | | | |
|---|---|---|---|
| Enrichment Routine | | Match Rule | |
| Well WKE ▷ | | Attribute Check ▷ | |
| Source Attribute | | Attribute Description | |
| ☒ | API | API Number | |
| ☐ | Basin | Basin | |
| ☐ | CompletionDate | Completion Date | |
| ☐ | MeasuredDepth | Measured Depth | |
| ☐ | GroundElevation | Ground Elevation | |
| ☐ | Latitude | Latitude | |

Back    Next

Fig. 15

Enrich & Visualize
Define Secondary Data Below

GUI 1600

Visualization

| Attribute | Title | GIS | Grid View | Card View | Fly Out View | WKE Widget |
|---|---|---|---|---|---|---|
| API | ☐ | ☐ | ☒ | ☒ | ☒ | ☒ |
| Well Name | ☒ | ☒ | ☒ | ☒ | ☒ | ☒ |
| CompletionDate | ☐ | ☐ | ☒ | ☐ | ☒ | ☒ |
| MeasuredDepth | ☐ | ☒ | ☒ | ☒ | ☒ | ☒ |
| GroundElevation | ☐ | ☐ | ☒ | ☒ | ☒ | ☒ |
| Latitude | ☐ | ☒ | ☒ | ☒ | ☒ | ☒ |
| Longitude | ☐ | ☐ | ☒ | ☐ | ☒ | ☒ |
| BottomHolePressure | ☐ | ☐ | ☒ | ☐ | ☐ | ☒ |
| BottomHoleTemperature | ☐ | ☐ | ☒ | ☐ | ☐ | ☒ |
| Other | ☐ | ☐ | ☐ | ☐ | ☐ | ☐ |

Back    Next

Fig. 16

GUI 1700

| Create New Template | | | | |
|---|---|---|---|---|
| Summary | | | | |
| Please Review Changes You Have Made to Suggestions Before Creating Template | | | | |
| File Added | Source | Entity Type | Legal Tag | Share With |
| Random_File.CSV | WellDateBase | WellBore | US-CONF-PLL | Everyone |

Template Name
    Wells

Description
    Please enter textual description of template

Once created you can edit through Template Management feature

Create New Template?

[ Back ] [ Create Template ]

Fig. 17

GUI 1800

| Create New Template | ▽ |
|---|---|
| File Added: ps_markers.csv | ▽ |

Source
[ Generic ▽ ]

Entity
[ Marker ▽ ]

Template Name*
[ Markers from CSV ▽ ]

Description
[ This template is for Markers in CSV format exported from PROSOURCE ]

[ Next ]

Fig. 18

GUI 1900

| | Attribute | Preview | Type | Format | Unit System | Dimension | Unit |
|---|---|---|---|---|---|---|---|
| ☐ | ID | 100001 | Number | | Dimensionless | - | - |
| ☐ | UBHI | 00006654-bda7-4a | Text | | - | - | - |
| ☐ | Borehole_Name | Quint 1 | Text | | - | - | - |
| ☐ | Informal_Surf_Name | Arbuckle Group | Text | | - | - | - |
| ☒ | Pick_Depth | 1054.60 | Double | | English | Length | ft |
| ☐ | App_Name | 87bb02 | Text | | - | - | - |
| ☐ | Insert_Date | 44:04.0 | Text | | - | - | - |
| ☐ | Insert_User | PR_WD | Text | | - | - | - |
| ☐ | Borehole_ID | 129758 | Number | | Dimensionless | - | - |
| ☐ | Strat_Surface_ID | 137353 | Number | | Dimensionless | - | - |
| ☐ | Remarks | Not Encountered | Text | | - | - | - |
| ☐ | Surface_Name | WB Gas Unit 1' | Text | | - | - | - |
| ☐ | Interpreter | Forestberg | Text | | - | - | - |
| ☐ | Pick_Quality | 2140.0008 | Double | | Dimensionless | - | - |
| ☐ | Conformity_Rel. | 51e8026f-secd-45d | Text | | - | - | - |
| ☐ | Position_ID | 136620 | Number | | Dimensionless | - | - |
| ☐ | TVD_SS | | Number | | English | Length | ft |
| ☐ | Shape | | Number | | Dimensionless | - | - |
| ☐ | Absolute_X | | Number | | Dimensionless | - | - |

Geo ▽
Map
2D
3D

Dim. ▽
Length
Time
Area

Back   Next

Fig. 19

GUI 2000

| Create New Template | | | | |
|---|---|---|---|---|
| Summary    Please Review Changes You Have Made to Suggestions Before Creating Template | | | | |
| File Added | Source | Entity Type | Legal Tag | Share With |
| ps_markers.csv | Generic | Marker | slb-oob27d94a | Everyone |

Template Name
   Markers from CSV

Description
   This template is for Markers in CSV format exported from PROSOURCE

[ Back ] [ Create Template ]

Fig. 20

GEOLOGIC FORMATION OPERATIONS FRAMEWORK

This application claims the benefit of India Patent Application No. 201921028674 filed on Jul. 16, 2019, and is hereby incorporated by reference in its entirety.

BACKGROUND

Various field operations can be performed with respect to a geologic formation. Such operations can include exploration operations, development operations, production operations, etc., with respect to a reservoir in the geologic formation.

As an example, an operation can be a seismic survey that utilizes equipment to acquire a seismic data set as measured and recorded with reference to a particular area of the Earth, for example, to evaluate a subsurface formation. A seismic survey can be acquired using one or more of surface, ocean/sea bottom, marine, borehole, land or other technology. A seismic survey can acquire a seismic data set or sets, which can be spatial (e.g., 1D, 2D or 3D) or spatial and temporal (e.g., 1D, 2D or 3D in space and 1D in time). Seismic data can be visualized by processing and rendering to a display where an interpreter can identify and select boundaries that can are representative of structure(s) in the Earth (e.g. reflectors, etc.).

As an example, an "Earth model" may be constructed using interpreted seismic data and optionally one or more other types of data. For example, consider constructing an Earth model that represents a reservoir using seismic data and exploratory borehole data and performing a simulation of physical phenomena (e.g., fluid flow, etc.) using a reservoir simulator. Results of a simulator can indicate a possible target that may be reached by drilling a borehole into the formation where the borehole can be completed to form a well that can produce fluid from the reservoir.

As an example, an operation can be a drilling operation where a borehole can be drilled into a geologic formation where the bore may be utilized to form a well. As an example, an operation can be a logging operation, which may be a wireline logging operation, a logging while drilling operation or another type of logging operation. After a borehole is formed by drilling, a formation is exposed via the borehole, which provides an opportunity to utilize one or more logging tools to acquire measurements (e.g., via sensors) that can be processed to determine properties of the formation (e.g., rock properties, fluid properties, etc.). As an example, logging may be performed before, during or after casing, cementing, fracturing, treating, etc. As an example, a cased-hole logging tool may include equipment to measure fluid flow rates and/or one or more other production parameters in a wellbore or, for example, to examine integrity of a casing and/or cement.

A rig can be a system of components that can be operated to form a borehole in a geologic formation, to transport equipment into and out of a bore in a geologic formation, etc. As an example, a rig may include a system that can be used to drill a bore and to acquire information about a geologic formation, drilling, etc. As an example, a rig configured for drilling can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rotary steerable system (RSS) can be utilized to drill directionally. An RSS can include a bottom hole assembly (BHA) that includes features that provide for directional drilling. As an example, a rig or other surface equipment (e.g., onshore or offshore) may be utilized to perform one or more other types of operations, which can include logging operations.

SUMMARY

A method can include receiving a selection for data via a graphical user interface rendered to a display; via the graphical user interface, initiating a data ingestion process for the selected data; via the graphical user interface, rendering data descriptors generated by the data ingestion process; via the graphical user interface, issuing a validation instruction that validates the data descriptors; and, via the graphical user interface, issuing an instruction that stores a data ingestion template that includes the validated data descriptors. A system can include a processor; memory accessible to the processor; processor-executable instructions stored in the memory and executable by the processor to instruct the system to: receive a selection for data via a graphical user interface rendered to a display; initiate a data ingestion process for the selected data; render data descriptors generated by the data ingestion process; receive a validation instruction that validates the data descriptors; and store a data ingestion template that includes the validated data descriptors. One or more computer-readable storage media can include computer-executable instructions executable to instruct a computing system to: receive a selection for data via a graphical user interface rendered to a display; initiate a data ingestion process for the selected data; render data descriptors generated by the data ingestion process; receive a validation instruction that validates the data descriptors; and store a data ingestion template that includes the validated data descriptors. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 12 illustrates an example of a graphical user interface;

FIG. 13 illustrates an example of a graphical user interface;

FIG. 14 illustrates an example of a graphical user interface;

FIG. 15 illustrates an example of a graphical user interface;

FIG. 16 illustrates an example of a graphical user interface;

FIG. 17 illustrates an example of a graphical user interface;

FIG. 18 illustrates an example of a graphical user interface;

FIG. 19 illustrates an example of a graphical user interface;

FIG. 20 illustrates an example of a graphical user interface;

DETAILED DESCRIPTION

Figure 1:
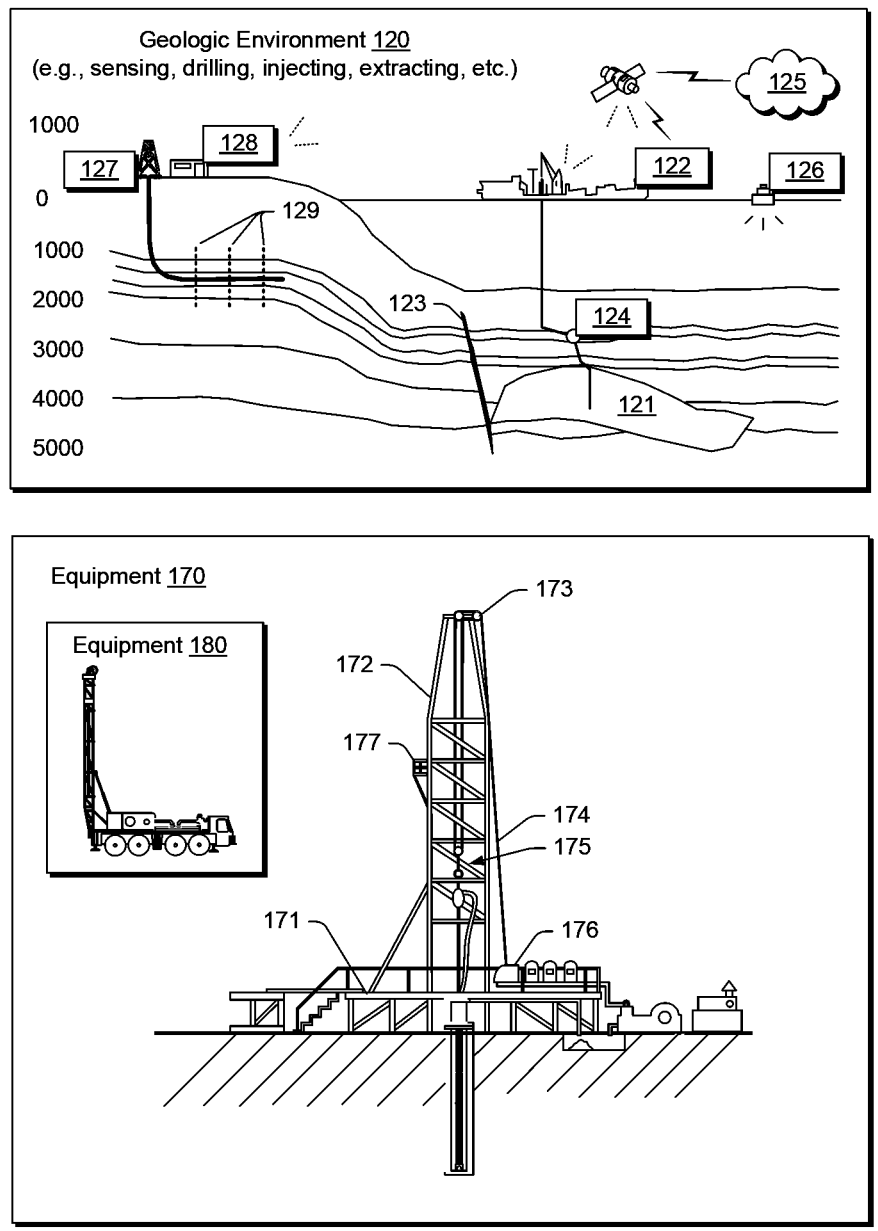
FIG. 1 illustrates examples of equipment in a geologic environment.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
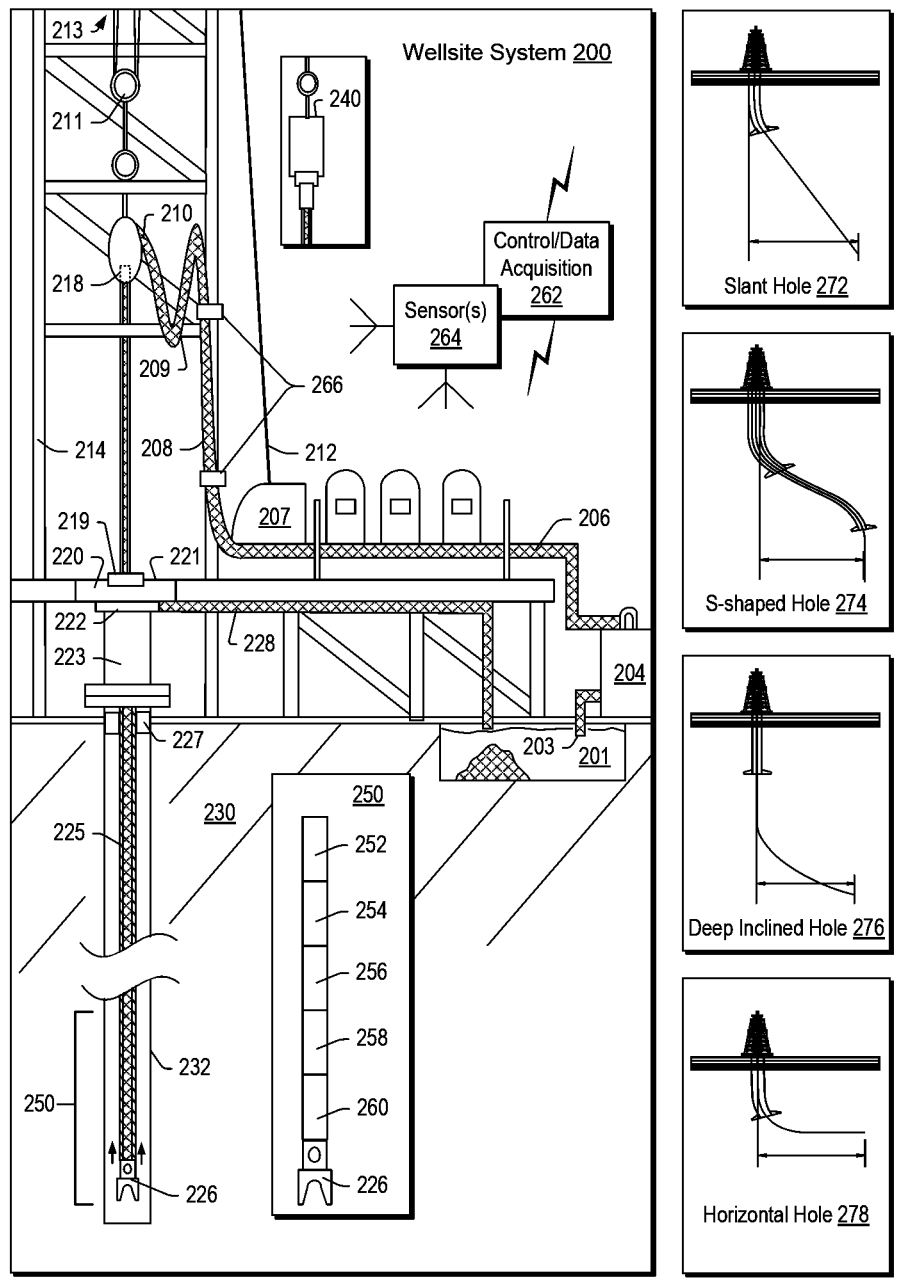
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
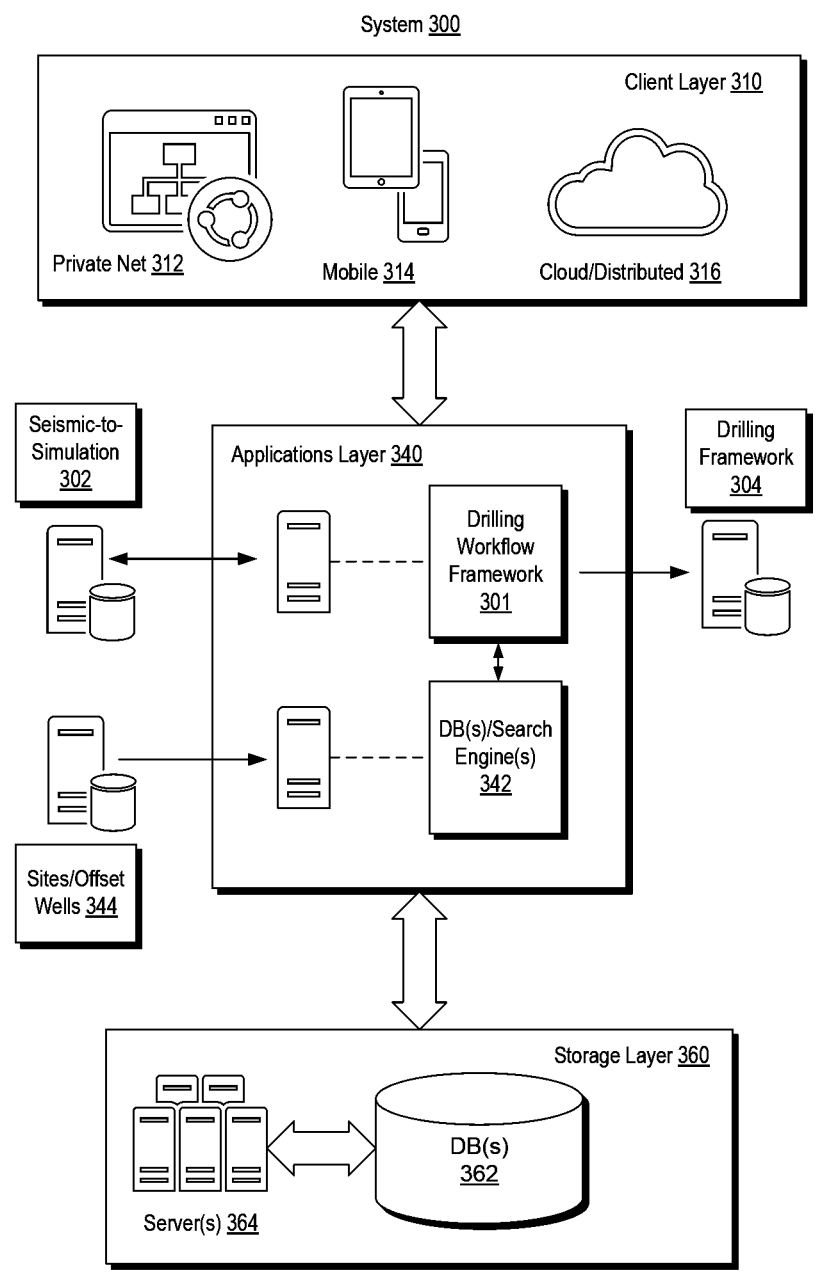
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules.

As an example, the database management component 342 can include one or more search engine modules that provide for searching one or more information that may be stored in one or more data repositories. As an example, the STUDIO E&P knowledge environment (Schlumberger Ltd., Houston, Tex.) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, Wash.). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, Calif.).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
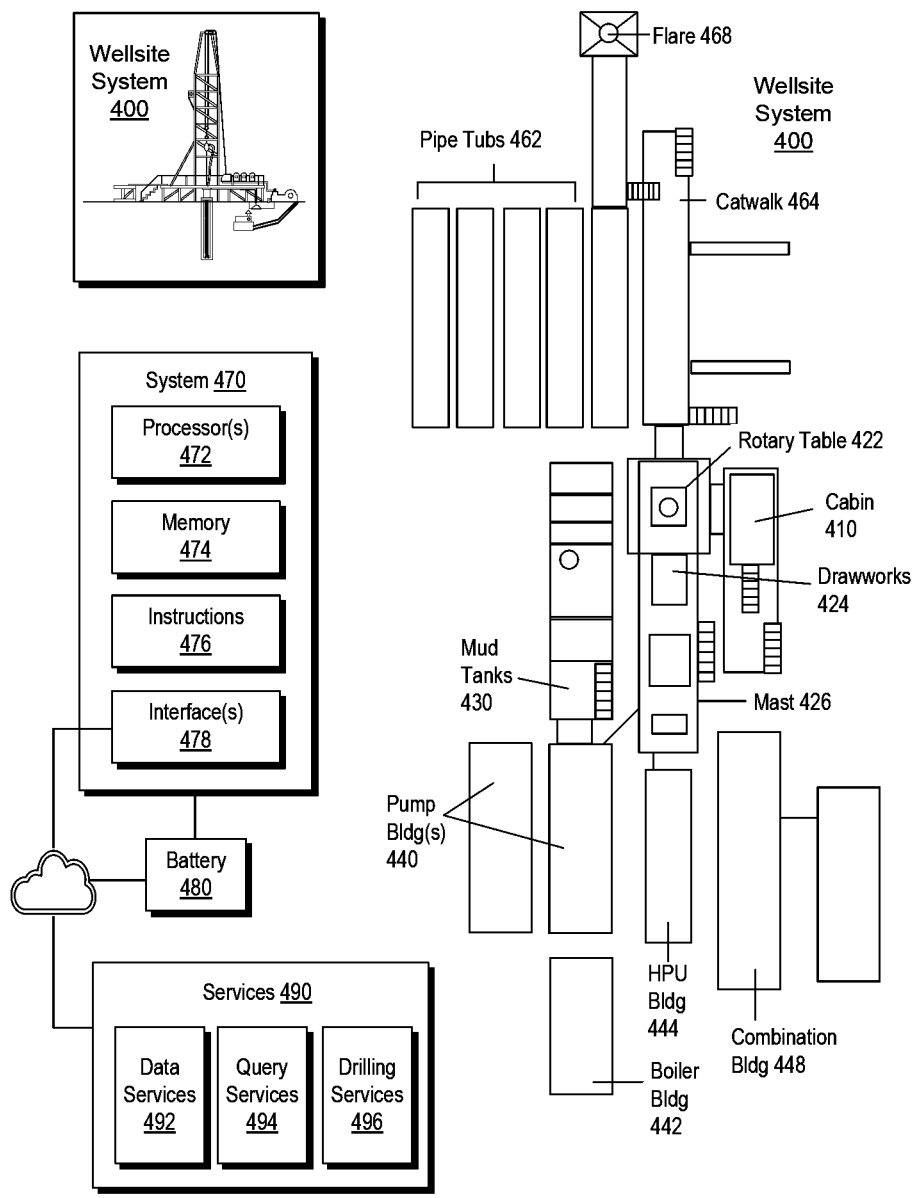
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measurement-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
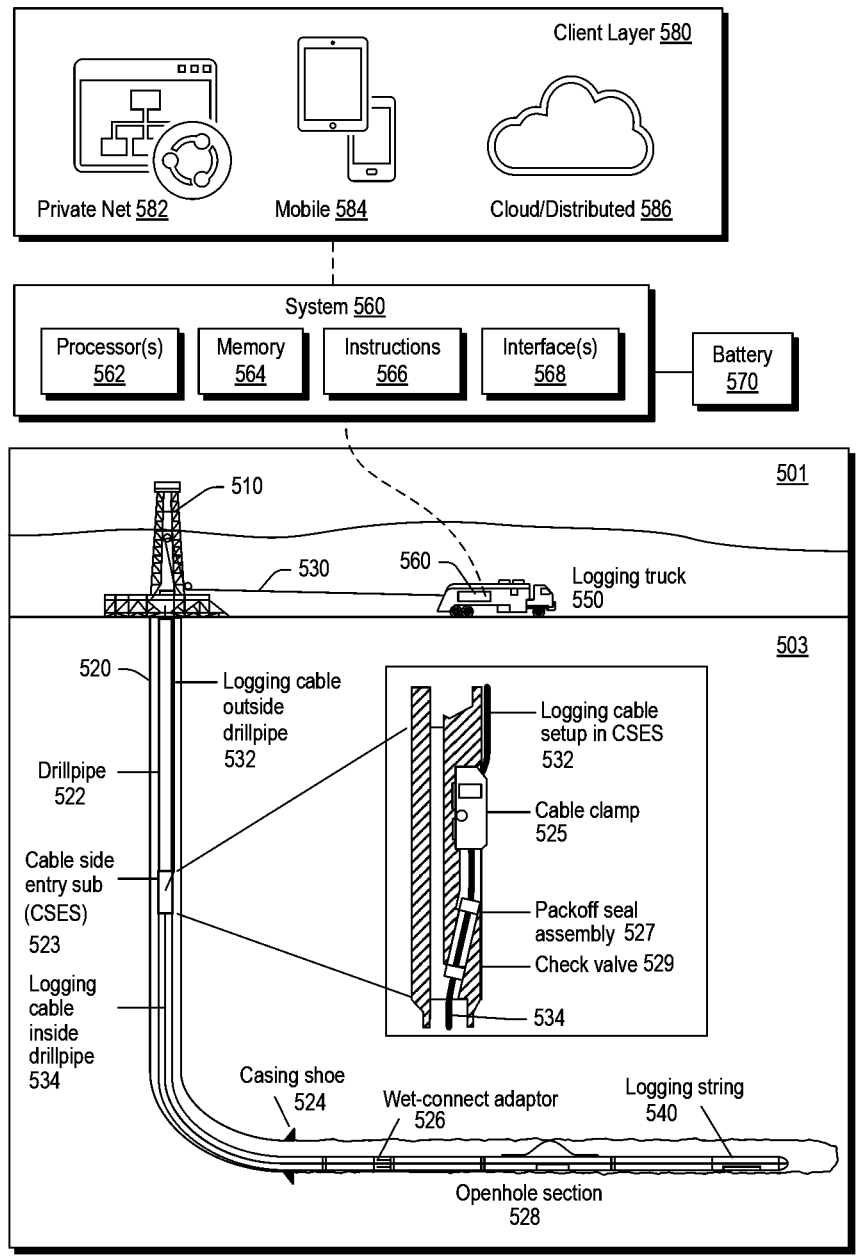
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
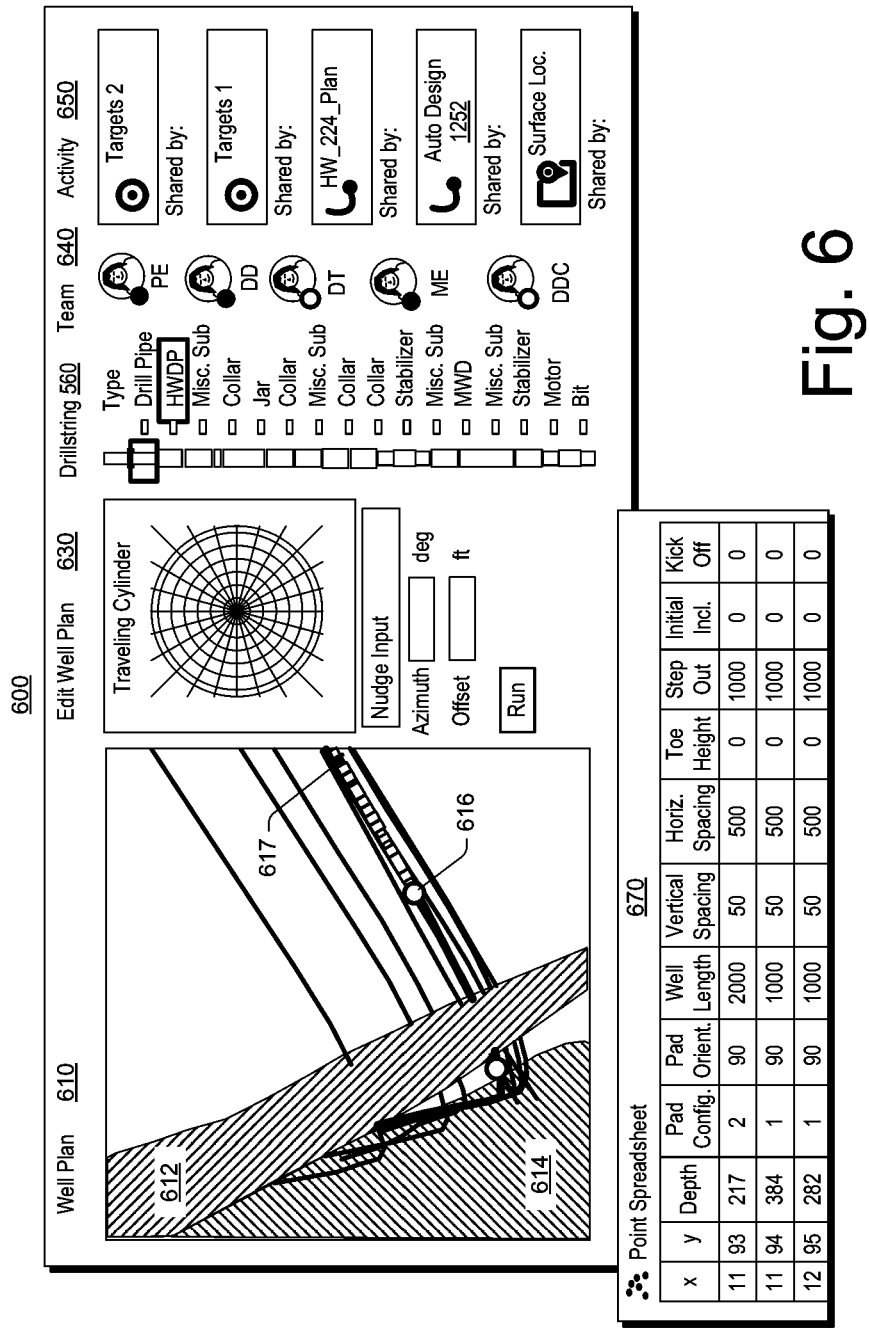
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650. As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). FIG. 6 also shows a table 670 as a point spreadsheet that specifies information for a plurality of wells. For example, the point spreadsheet can include coordinates, dimensions, etc., that specify a trajectory of a well, spacing of wells, etc.

Figure 7:
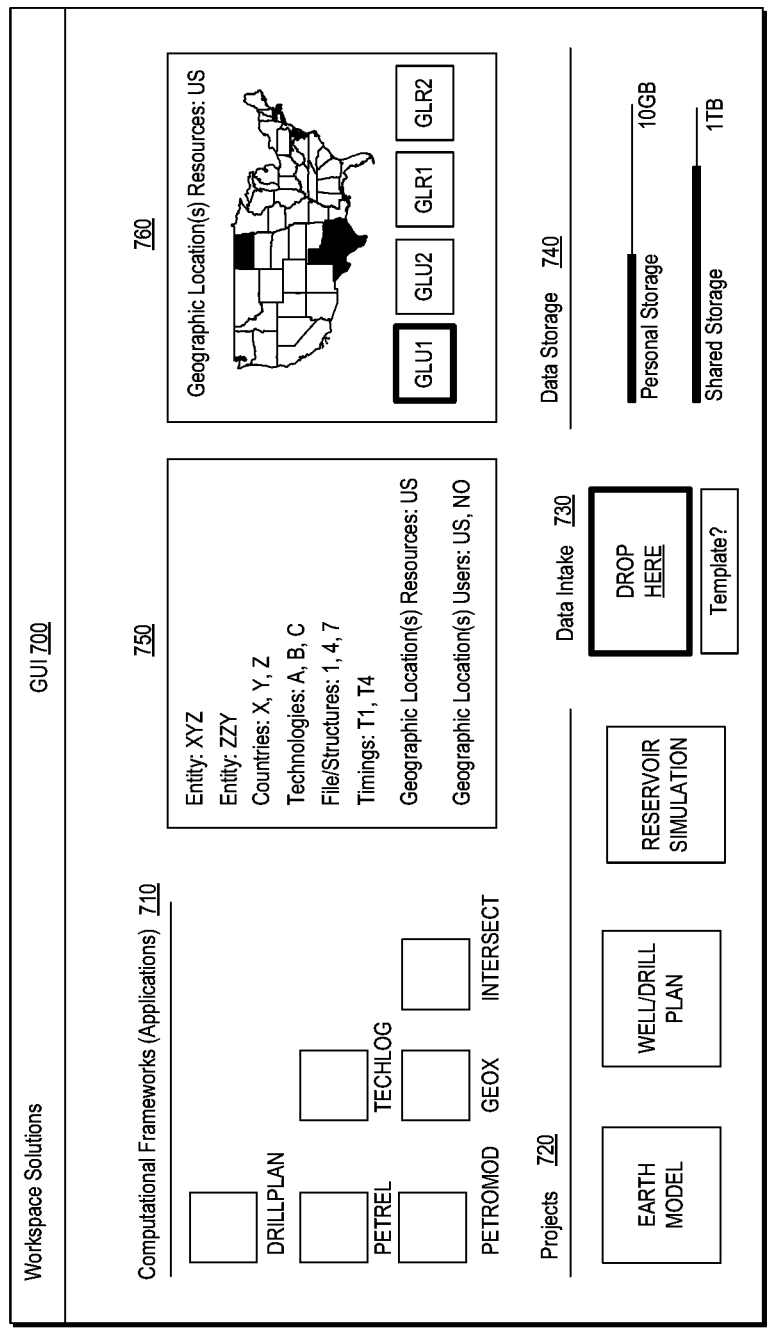
FIG. 7 illustrates an example of a graphical user interface.

FIG. 7 shows an example of a GUI 700 that includes various features that can be part of a workspace. For example, a computational framework area 710 includes icons that represent various types of computational frameworks such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), and a reservoir simulation framework (INTERSECT, Schlumberger Limited, Houston, Tex.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. As an example, the GUI 700 may be a part of an environment such as the DELFI environment.

As an example, one or more computational frameworks may be suitable for use in a system such as the system 300 of FIG. 3, the wellsite system 400 of FIG. 4, the system 500 of FIG. 5, etc. The GUI 700 can include a projects area 720 for various types of projects, a data intake area 730 for ingestion of data, a data storage area 740 for rendering graphics associated with data storage, a specifications area 750 for rendering of specifications that may be associated with one or more projects, and a geographic locations area 760 for rendering of various geographic locations as may be associated with one or more projects and/or one or more sets of data that may be ingested via a control of the data intake area 730 (see also, e.g., FIG. 21). Such a process may be referred to as, for example, a data ingestion process or a file ingestion process.

As an example, a user of the GUI 700 may select a data file (e.g., as an icon, as a URL, etc.) and drop it in the data intake area 730 such that data of the data file is ingested for utilization in one or more projects, which may utilize one or more of the computational frameworks. In the example of FIG. 7, the types of data or data files that can be ingested can be varied. As an example, the data intake area 730 and underlying control(s) can be a portal, which may be a secure portal, through which data are to "pass" before they can be utilized via one or more of the computational frameworks and/or projects.

In the example of FIG. 7, the data intake area 730 can be operatively coupled to one or more remote resources. For example, the GUI 700 may expose a remote drive or drives such as a cloud-based drive. As an example, a remote resource may be managed using a cloud platform. For example, consider a GOOGLE cloud platform, an AMAZON WEB SERVICES (AWS) cloud platform, a MICROSOFT AZURE cloud platform, etc.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semi-structured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor may generate time series data, which may be regular and/or irregular in time and which may or may not include a "global" time marker (e.g., time stamps, etc.). As an example, data may be in a wellsite information transfer standard markup language (WITSML) standard, which is a standard utilized in various operations including rig operations. As an example, data may be serially transferred ASCII data.

In the example of FIG. 7, one or more of the computational frameworks may be local and/or one or more of the computational frameworks may be remote. For example, the GUI 700 may be rendered locally using a display operatively coupled to a workstation (e.g., laptop, desktop, etc.) where the workstation includes executable instructions for instantiating a computational framework and/or the GUI 700 may be rendered locally using a display operatively coupled to or part of a computing device that includes one or more network interfaces that can operatively couple to one or more remote resources that can instantiate a computational framework. For example, consider a remote resource being a cloud-based resource. As an example, controls of the data intake area 730 may operate in cloud-based resources that are in a cloud platform that is common with data to be ingested and/or one or more computational frameworks to be utilized, which may consume ingested data.

As explained, some features of a system may be local and some features may be remote and various features may be within a common platform such as a cloud platform. As an example, the data intake area 730 can be a local control that causes remote actions that provide for interoperability between ingested data and one or more of the computational frameworks as may be indicated in the computational framework area 710 of the GUI 700.

As an example, a method may be implemented at least in part as a microservice. As an example, a microservice may utilize the JSON format for transferring both requests and responses. In such an example, information may optionally be sent using representational state transfer (REST) where information may be transformed to JSON format. As an example, a service that utilizes REST may be referred to as a RESTful service, which may be a RESTful microservice. As an example, a method may be implemented using the DELFI environment, the PETREL framework, etc. As an example, a method may be implemented using one or more application programming interfaces (APIs). For example, consider an approach that utilizes an API-based microservice where resources may be remote from a device of a user. In such an example, the device may include a browser application that can transmit information as one or more API calls to a remote computing system (e.g., cloud-based, etc.) and receive in response information generated by the remote computing system. As an example, a user may interact with a GUI to cause transmission of an API call as associated with a microservice. In response, a device may receive an indication from the microservice that one or more actions have been performed, are queued to be performed, have been triggered, etc.

As to the GUI 700, as an example, consider a scenario where a user commences a new project (e.g., a project associated with one or more computational frameworks). In such a scenario, if no data are ingested via the data intake area 730, then the user may be unable to utilize one or more of the computational frameworks. To remedy the situation, the user can access data as a rendered representation (e.g., icon, URL, etc.) and drag and drop it onto the data intake area 730. As an example, a GUI may include an ability to open a window for viewing data as may be listed in folders, URLs, file icons, etc., and dragging and/or right clicking (or other action) to select particular data for ingestion (e.g., a browser feature). An approach may be additional to or alternative to the data intake area 730 approach. Regardless of the control "style", in the example of FIG. 7, a user can actuate one or more controls for the purposes of data ingestion as explained with respect to the particular example of the data intake area 730.

Once some amount of data has been ingested, the user may actuate one of the icons to instantiate or otherwise access one of the computational frameworks, which may be utilized to process at least a portion of the data for purposes of furthering the newly commenced project.

As an example, a data intake control may determine a size for data and compare to data storage as indicated in the data storage area 740 to determine whether a user has sufficient available data storage space (e.g., whether local and/or remote). Where space is not an issue, an ingestion process can commence data processing such that the data become available, if appropriate and/or as appropriate, for utilization.

Referring again to the GUI 700, the specifications area 750 shows some examples of specifications, which may be pre-filled and/or generated via a data ingestion process. For example, specifications can include one or more entities, one or more countries (e.g., geographic locations, nations, regions, etc.), one or more technologies, one or more file and/or data structures, one or more timings, one or more geographic locations as to one or more resources, and one or more geographic locations with respect to one or more users (e.g., consider a collaborative project with multiple users, which may be a team).

In the example of FIG. 7, the GUI 700 includes the area 760, which may be utilized to render graphics as to geography, time, etc. For example, the area 760 can be a spatial and/or temporal area for rendering of graphics pertaining to space and/or time as may be associated with data, which can include ingested data and/or data to be ingested.

Figure 8:
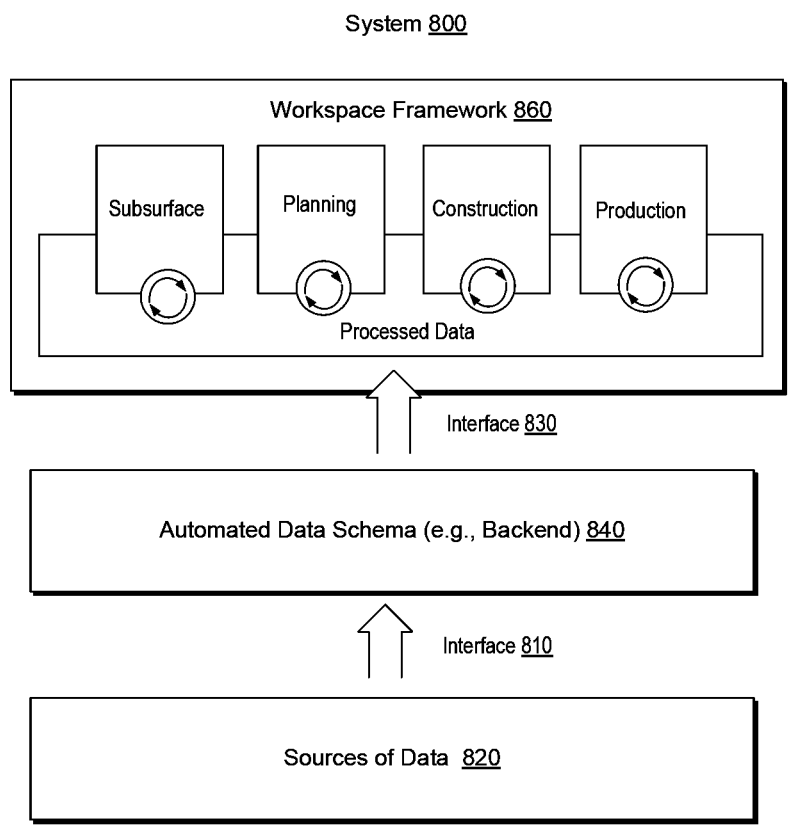
FIG. 8 illustrates an example of a system.

FIG. 8 shows an example of a system 800 that includes an interface 810 for sources of data 820, an interface 830 for ingestion of data via an automated data schema component 840 and a workspace framework 860 that is operatively coupled to various computational frameworks such as computational frameworks for subsurface modeling, well planning, well construction and resource production. As shown in the example of FIG. 8, the interface 830 can allow for the computational frameworks to ingest processed data, which may be available locally and/or remotely (e.g., in a cloud environment, etc.).

As an example, a user may utilize the GUI 700 of FIG. 7 to cause the system 800 of FIG. 8 to ingest data utilizing one or more ingestion services (e.g., optionally including one or more microservices). In such an example, the automated data schema component 840 can process identified data from one or more of the sources of data 820 such that data descriptors are generated and optionally data conversions performed to facilitate one or more workflows that utilize one or more of the computational frameworks as in the workspace framework 860 of the system 800, which may correspond to one or more of the computational frameworks of the computational frameworks area 710 of the GUI 700. As an example, one or more of the data descriptors may be rendered in the specifications area 750 of the GUI 700, which may be interactive with the geographic locations area 760 of the GUI 700 (see also, e.g., FIG. 19). As mentioned, the geographic locations area 760 may provide for spatial and/or temporal renderings of graphics representative of data and/or data descriptors. As an example, a data descriptor may be associated with an attribute or may include an attribute (e.g., as a label, etc.).

As an example, a system can include various ingestion pipeline services (e.g., ingestion "data pipeline" services). Such services can be part of a client-server infrastructure. For example, a client or frontend can provide for rendering of graphic controls that allow a user to select one or more data items for processing by a server or backend. In such an example, the one or more data items can include data items that are backend (e.g., stored remotely) or optionally frontend (e.g., stored locally). As to data items, these may include one or more types of data such as, for example, generated by a seismic survey, data generated via logging, data generated via satellite imaging of the Earth, data generated via simulation, data generated via laboratory analyses, etc.

As an example, ingestion pipeline services can be utilized to dynamically orchestrate data curation through a configurable, extensible smart "pipeline" encompassing the breadth of data management stage gates (e.g., ingestion, enrichment, classification, data quality, indexing) and can be extensible beyond the stage gates, for example, to handle unforeseen datatypes and/or workflows.

As an example, an extensible pipeline service can be leveraged by documenting and persisting incoming data in a known, consistent, manner according to a schema, representing various aspects of the data. For example, consider aspects such as source of data, data semantics (what the data represent such as an object and/or an entity of an Earth model, of a computational framework, etc.), representative properties (e.g., of an object, entity, etc.), representative attributes (e.g., of an object, entity, etc.), data frame of reference, data relationship(s), etc.

As to source of data, consider the PROSOURCE E&P data management system (Schlumberger Limited, Houston, Tex.), which provides management, visualization, and delivery capabilities for various types of data to streamline workflows. Such a system can provide real-time capabilities to proactively manage wellbore operations using vendor-neutral data aggregation features. As an example, an aggregator system can be an operations equipment ready system that can be integrated into a system for a desired location with data connectivity (e.g., rig equipment installation, logging equipment installation, seismic equipment installation, laboratory equipment installation, etc.). As an example, a real-time data system can collect multiple data types, which may include customized data types according to customized data formats and/or one or more of the following data formats: WITS (serial, file, TCP, and http); WITSML (1.1, 1.2, 1.3.1.1 client and server); OPC-DA and OPC-UA (clients); DLIS; MAXWELL; and CSV.

As to a semantic understanding of what the data actually represents, consider data that represent a wellbore as an entity, which may be an object in an Earth model of a computational framework. As to a deterministic understanding of the various properties or attributes of the entity, these may vary from source to source. As to a deterministic understanding of the frame of reference of source data, such an understanding can help to facilitate frictionless (e.g., optionally lossless) consumption. For example, various types of data may be compressed or uncompressed; in 6-bit, 12-bit, 24-bit, 32-bit, 48-bit, 64-bit or other bit depth; in a color standard (e.g., RGB, HCL, LUV, etc.); in a time series, etc. As an example, an ingestion service may provide for one or more options and may automatically select an option as to how data are to be ingested, which may depend on one or more types of computational frameworks that can consume the particular data. For example, where a computational framework is limited to a particular bit-depth, the ingestion service may "downsize" the data (e.g., from 48-bit to 12-bit). As an example, where a computational framework is limited to a particular file type (e.g., JPEG, BMP, TIFF, etc.), the ingestion service may include one or more filters, converters, etc., that act to assure the data ingested is provided in a manner suitable for direct use by the computational framework. As to a deterministic understanding of how data relates to other data (e.g., in a common dataset or another dataset), such an approach may aim to heuristically determine (e.g., through relationship mining) one or more connection points of interest. For example, a rig identifier may be utilized to establish a connection point of interest between data. In such an example, it may be determined that the rig identifier corresponds to a wellsite with longitude and latitude and that the rig corresponding to the rig identifier was at that wellsite for a number of weeks. In such an example, particular data associated with the rig identifier can be segmented in time for a time associated with the wellsite. With the wellsite known for the particular data, it may be further associated with other data for that wellsite.

As an example, an ingestion service can include a manual mode or manual modes. In a manual mode, an individual can configure some aspects of the ingestion service, which may be in an iterative manner that explores data and renders a portion of the data for decisions to be made by the individual. In such a manual mode, however, various features of the ingestion service can be maintained in an automated manner. For example, security-based (e.g., regulatory, contractual, legal, etc.) aspects may be automated and unable to be performed in a manual mode such that an individual cannot ingest and/or view data that may be secure or subject to one or more security constraints. In a manual mode, various automated features may be unavailable, for example, relationship searching may be unavailable due to an inability to perform tasks across various types of data. For example, manual mode may be limited to addressing data in a type-by-type manner, which, for large amounts of data and/or disparate sources of data, would take a substantial amount of time and would lack logical features and result in ingestion of data that would be suboptimal in terms of time spent and would be suboptimal in terms of the data ingested. For example, a manual mode may lack deep knowledge of features of one or more computational frameworks such that ingested data are not directly compatible with one or more of the one or more computational frameworks. In such an example, additional time would be spent by a user to either make data compatible and/or re-ingest the data such that it is compatible. Such an approach can be suboptimal at the workflow level of a project as it can result in interruption that may depend on access to substantial computational resources to address incompatibilities (e.g., consider conversion of a terabyte or more of seismic survey data, etc.).

As an example, an ingestion service can provide for automated ingestion, which can include one or more of automated indexing, automated enrichment, automated discovery of computational frameworks, automated discover of one or more workflows, automated discovery of one or more catalog services, automated discovery of one or more computational resources (e.g., GPUs, memory, displays, etc.), etc.

As an example, ingestion services can include a template generator. For example, a manual mode may be available for generating a template for use in automated data ingestion. Such a service may be provided as an ingestion template widget, which may be implemented as a frontend service (e.g., client side) that is operatively coupled to a backend service (e.g., server side). As an example, ingestion services can include an automated or semi-automated template generator.

As mentioned, ingestion services can include a drop file widget. As an example, ingestion services can include a management application (e.g., an app, which may be executable in part via a mobile device, an Internet enabled piece of operational equipment (e.g., rig equipment, logging equipment, laboratory equipment, etc.)).

As an example, ingestion services can include geographic information system (GIS) features, which can include GIS backend and frontend features. For example, an ingestion service can access an ArcGIS server and can include an ArcGIS server compatible client. In such an example, one or more ORACLE components (Oracle Corporation, Santa Clara, Calif.) may be included (e.g., a 64-bit ORACLE client such as the ORACLE client for an ArcGIS client. As to a backend, consider the ArcGIS server for the MICROSOFT .NET framework. As an example, resources local and/or remote can include multiple core processing equipment. As an example, services can include an ArcGIS Desktop Basic component.

As an example, an ingestion service can access GIS resources during ingestion to provide for rendering of GIS data in text, graphical and/or image form to allow a user to see a geographic location as may be associated with data being ingested (see, e.g., the geographic locations area 760 of the GUI 700 of FIG. 7). While a GIS type of system is mentioned, a lightweight mapping service may be utilized for an informative but a user experience that is of lesser richness. For example, with a GIS type of system, a user may be able to see a wellsite at one or more times, which can include a past time from a past satellite or other image and a latest time from a latest satellite or other image. As to imagery, it may be available in one or more forms (e.g., visible, IR, UV, microwave, etc.). As to a lightweight mapping service, it may provide for a graphical map with an indicator as to a location or locations associated with data. For example, where a user believes data to be associated with a wellsite in the North Sea and where an ingestion service uncovers indicia of a wellsite in Nigeria, the ingestion service may utilize the lightweight mapping service to render markers to a map to show that Nigeria data are present. Such an approach may, for example, interrupt ingestion. For example, if the user is prohibited from accessing and/or viewing the Nigerian data, the ingestion service may be halted until the issue is suitably addressed. For example, a message may be sent to an individual or entity responsible for the data to clarify and/or clean the data, for example, to delete and/or explain why the Nigerian related data appeared in what was believed to be North Sea data. As an example, where an individual has authority as to both North Sea and Nigerian data, the individual may view a rendering and accept and/or reject one or more associations. For example, if the individual is working on a project for a wellsite in the North Sea, the individual may click on a rendered map with the Nigerian location marked and cause the ingestion service to "deny" the association. For example, the ingestion service may provide for a right click on the location to visualize the underlying reason (e.g., data) for the Nigerian determination, which may simply be a telephone number with a country code for Nigeria. In such an example, the individual can deny the association as being inappropriate or irrelevant to the project in the North Sea such that the ingestion process can continue.

As explained, an ingestion system can include multiple components, which may be distributed (e.g., frontend-backend, client-server, etc.). Such a system can dynamically discover and model a schema of source data, which may be via a user interface embedded within a drop file widget. As an example, a system can include a template generator service such that a user may generate a template before commencing an ingestion process for particular data (e.g., as a frontend and/or backend service). A backend service can be an ecosystem dataset schema generator service and a frontend service can be an ecosystem ingestion template widget.

As an example, a user may leverage a frontend widget to harness the power of one or more backend services. As an example, a service can analyze a dropped file, and heuristically predicts the data model for data of the file and suggest the data model to a user for validation, which can be confirmed, denied and/or modified through a frontend user interface (e.g., GUI). As an example, a GUI may enable a user to make "micro" adjustments to heuristic detections (e.g., modifications) and, for example, may provide for explicitly specifying one or more aspects which may be missed by heuristic detection.

While backend services are mentioned, as an example, a system may utilize one or more frontend services. As mentioned, a GUI may utilize and/or provide access to one or more microservices. As an example, a GUI may utilize widgets and/or microservices, for example, consider a widget UI bundled into microservices (e.g., microservice stacks, etc.) and a portal UI assembled from widgets. An architecture may specify server-side data handling and logic and/or specify one or more application UIs based on microservices. For example, consider a composite UI produced by microservices (e.g., frontend) with a monolithic client app consuming the microservices. In such an approach, one or more of the microservices can include both logic and visual representation.

As to ingestion of information (e.g., data, a file, etc.), a schema or schemas may be generated, utilized, etc. As an example, a schema can be or include one or more dataset descriptors. As an example, a schema can be or include an attribute catalog, a data catalog, or a data dictionary that can be used by consuming services for processing data effectively and efficiently, optionally without further user input. As an example, an ingestion service can provide for a "schema on read" service. As an example, "on read" of data (e.g., a file, etc.), one or more actions may occur that can facilitate ingestion, which may include one or more of template actions, schema actions, data analysis actions, etc.

As an example, an ingestion service can provide statistical information. For example, instances of numbers, instances of words, instances of sequences, etc., may be determined and rendered to a display using statistical descriptors. As an example, consider a command file for an automated drilling system where a command for acquiring mud flow rate data appears a number of times, which may be statistically analyzed with respect to one or more other commands (e.g., a top drive command, a RSS command, etc.). As another example, consider a command file for an automated logging system where a command for depth measurement appears a number of times, which may be statistically analyzed with respect to depth data for a log or logs. For example, consider linking a command for a depth measurement (e.g., a depth stamp) and data as acquired at a depth or depths. In such an example, a wireline may be moving in a borehole where a sensor acquires measurements with respect to time and where a depth command acts to impart a depth stamp after a particular number of measurements. Such a depth stamp can be utilized in combination with one or more time stamps to generate statistics for data (e.g., number of data points taken between each depth stamp, which may be accompanied by a data acquisition rate, a movement rate, etc.).

As an example, an ingestion service can generate a dataset descriptor that establishes a known schema for a dataset with recorded frame of reference information, such as units of measure; enable one or more data validation workflows; and enable standardization on one or more attributes for discovery such as one or more of: temporal discovery (e.g., standardizing date formats to ISO8601TZ format); spatial discovery (e.g., transforming spatial locations to WGS84 format for visualization on a web-based GIS Tool, etc.); and enable relationship declaration and discovery.

As an example, an ingestion service can automate ingestion template generation and specify a dataset descriptor (e.g. consumption catalog/schema) to enable enrichment, ingestion, and discovery. As mentioned, a manual mode may be available where a user may manually edit several entries (e.g., 6 to 8, where the number may depend the type of ingestion, enrichment, and discovery workflows demanded). As mentioned, an ingestion service may account for provisioning to various environments, optionally without involvement of a development operations engineer to deploy to development environments. As an example, an ingestion service may provide for pushing data to one or more production environments. For example, consider ingesting data germane to operation of an electric submersible pump (ESP) or other artificial lift technology to a wellsite that includes one or more controllers for controlling operation of one or more pieces of artificial lift equipment. In such an example, a push of data can push commands such as a command sequence suitable for configuring an ESP controller, a gas lift valve, a wellhead choke valve, etc. Such commands may be ingested based on an operational file dataset for another well in a common field or for another well in a different field.

As an example, an ingestion service can be user-driven via client side implementation of a widget, service, app, or other type of application. As an example, an ingestion service can provide for user created ingestion templates, which may be created dynamically (e.g., on the fly) using one or more of a contextual analysis and heuristic analysis of data dropped into an ecosystem drop file facility (e.g., an area in a GUI, etc.).

As an example, an ingestion service can generate a confidential or secure template. For example, consider an entity that has encrypted and/or hashed particular data acquired using sensors in a downhole environment. A responsible individual of the entity may be entrusted with knowledge of such data processes and/or structures.

As to a hash, a hash can be a string or number generated from a string of text where the resulting string or number is of a fixed length and can vary with small variations in input. In some instances, a hashing technique may be used that makes it computationally impractical to turn a hash back into its original string. Hashing may be utilized in instances where a system aims to match a value with a stored value, but cannot store its plain representation for security reasons. As an example, another use can be checking the last few digits of a wellsite identifier or other type of identifier to match up with user input or, for example, comparing the hash of a file with the hash of the file as stored in a database to make sure that they are both the same file. In such an example, where a user has instructed a system to ingest a file, a hash of the raw file and the file as ingested may be stored. For example, the raw file may include units in a metric system and the file as ingested may include converted units in a different system. In such an example, hashes of the files may allow for future comparisons where the data are to be re-ingested or where, for example, an individual instructs another team member to ingest the same file and perform the same conversion to assure that both team members are working from the same data.

As an example, an ingestion service that has a stored past hash of a file may utilize the stored past hash and a new hash to determine whether contents of the file have changed. In such an example, an ingestion service may, in response, perform an analysis on the two files (e.g., version X and version Y) to determine a delta (e.g., a change delta). In such an example, a schema may be different depending on the delta. For example, if there is no delta (e.g., a match of hashes), then an ingestion service may utilize an already generated schema; however, where a delta exists, then the ingestion service may generate a new schema. In such an approach, a schema generator may operate on the delta rather than the entire file or, to help assure proper relationship(s) where a risk of not relating the delta to other data exists, the schema generator may generate a new schema.

As to encryption, a data file may be subjected to encryption that turns data into a series of unreadable characters, which may not be of a fixed length. As an example, a difference between encryption and hashing can be that encrypted strings can be reversed back into their original decrypted form for an individual or system that possesses the appropriate key.

As an example, a system may utilize symmetric key encryption or public key encryption. In symmetric key encryption, the key to both encrypt and decrypt is the same; whereas, public key encryption utilizes different keys, for example, one used to encrypt the string (the public key) and one used to decrypt it (the private key). In such an approach, the public key can be made available for a system to use to encrypt data; however, possession of the private key is demanded to decrypt the data.

As an example, one or more processes may include serializing an object (e.g., marshalling an object) to a series of bytes, etc., and/or deserialization, by extracting a data structure from a series of bytes, etc. (e.g., unmarshalling).

In a cloud platform such as the GOOGLE cloud platform, data uploaded are chunked. Data are broken into subfile chunks for storage; each chunk can be up to several GB in size. Each chunk is encrypted at the storage level with an individual encryption key: two chunks will not have the same encryption key, even if they are part of the same Google Cloud Storage (GCS) object, owned by the same customer, or stored on the same machine. If a chunk of data is updated, it is encrypted with a new key, rather than by reusing the existing key. This partition of data, each using a different key, means the "blast radius" of a potential data encryption key compromise is limited to that data chunk. In the GOOGLE cloud platform, data are encrypted prior to being written to disk. Each data chunk has a unique identifier. Access control lists (ACLs) ensure that each chunk can be decrypted GOOGLE services operating under authorized roles, which are granted access at that point in time. This prevents access to the data without authorization, bolstering both data security and privacy. Each chunk is distributed across GOOGLE cloud storage systems, and is replicated in encrypted form for backup and disaster recovery. A malicious individual who wanted to access customer data would have to know and be able to access (1) each of the storage chunks corresponding to the data they want, and (2) the encryption keys corresponding to the chunks.

In addition to storage system level encryption described above, in various instances, data may also be encrypted at a storage device level, for example, with at least AES128 for hard disks (HDD) and AES256 for solid state drives (SSD), using a separate device-level key (which is different than the key used to encrypt the data at the storage level).

As an example, encryption may be utilized that is additional to that of a cloud platform. For example, data may be encrypted prior to storage in a storage device of a cloud platform (e.g., optionally encrypted multiple times). In such an example, the encrypted data may be encrypted prior to storage where upon access to such encrypted data, decryption merely provides encrypted data that is ready for further decryption. As an example, an ingestion service can be configured to provide for one or more levels of decryption and/or encryption.

As an example, an ingestion service may operate using a local device or a remote device that is separate from a cloud resource component. Such an approach may help to ensure that particular types of data do not reside in an unencrypted form in a cloud platform. For example, consider a computer with a trusted platform module (TPM) that generates encrypted data for laboratory measurements from a laboratory instrument that analyzes core samples taken from a formation. In such an example, the computer may transmit the encrypted data for storage in a cloud platform where those data are not amenable to schema generation in the cloud platform. Rather, the schema generation may take place using the computer and a locally executing ingestion service, along with the computer's TPM to decrypt the data. In such an approach, the data can be processed, a schema generated and results encrypted using the TPM where the results may be transmitted back to the cloud platform. Where another user of a project team is to utilize the results as stored in the cloud platform, the user may receive an appropriate key as associated with the TPM to access the data stored in the cloud platform and decrypt it for appropriate use(s).

While various examples refer to a backend ingestion service, an ingestion service may optionally be implemented in a frontend manner, for example, where the backend is prohibited from having data in an unencrypted form. Such a prohibition may be due to the nature of the data, the location of the cloud platform resource or resources, etc. As mentioned, an architecture may utilize one or more frontend widgets, microservices, etc.

As an example, where an individual attempts to drop a file to a drop file widget (see, e.g., the data intake area 730) where the file is in encrypted form, the widget can issue a notification to indicate that the data of the file is secure or otherwise inaccessible. Where the file includes metadata or other date indicating a restriction, a backend service may issue a notification to an appropriate entity to indicate that an individual (e.g., a computer) tried to access that data file. As an example, a widget can issue a notification as to encryption and may include a field for entry of a key for decryption. For example, in the foregoing scenario, where Mary tried to access the file and an email was sent to George, George may understand that Mary would like to access the file and is authorized to do so such that George provides the appropriate key or otherwise directs Mary to the appropriate key. Once in possession of the key, Mary may enter it using the field in the widget such that the data can be ingested using one or more ingestion services.

As an example, an ingestion service may be operable without transmission of information and/or without leaving indicia of its operation that would be accessible to the developer of the ingestion service. For example, a provider of the ingestion service may assure customers that the ingestion service can be utilized without compromising security, confidentiality, etc., of a customer's data.

As an example, an ingestion service can enable domain feature delivery one or more teams in a manner for them to quickly experiment with new datasets, data models, and the like.

As an example, an ingestion service can provide domain, client, and third party features for delivery teams that demand ingestion of particular datasets that may be specific to one or more particular workflows. As an example, an ingestion service can be relatively immune to schema drift. For example, where new types of data are added to a dataset, the ingestion service can be extensible such that it can discover, optionally automatically, the new types of data. In such an example, where a data source adds, removes, renames, etc., one or more attributes, the ingestion service can automatically account for such change or changes.

As an example, an ingestion service can enable ingestion of data in a quick and easy way to enable data consumption in a predictable and consistent manner that can be tested and validated, for example, as to hypotheses and/or workflows.

As an example, a system can include a dataset descriptor generator. For example, consider a PYTHON language based utility for generating metadata for a given input file such that the input file can be processed effectively (e.g., ingested, enriched, indexed, etc.).

The PYTHON language is a multi-paradigm programming language that supports object-oriented programming and structured programming. Features in the PYTHON language can support functional programming and aspect-oriented programming. The PYTHON language uses dynamic typing, and a combination of reference counting and a cycle-detecting garbage collector for memory management. It also features dynamic name resolution (late binding), which binds method and variable names during program execution. The PYTHON language includes filter ( ), map( ), and reduce( ) functions; list comprehensions, dictionaries, and sets; and generator expressions. The PYTHON language library includes modules such as itertools and functools that can implement various functional tools.

As an example, a data descriptor generator (e.g., DD Generator) can generate a dataset descriptor in the JAVASCRIPT object notation (JSON) format. JSON includes data types such as the following:

Number: a signed decimal number that may contain a fractional part and may use exponential E notation.

String: a sequence of zero or more Unicode characters. Strings are delimited with double-quotation marks and support a backslash escaping syntax.

Boolean: either of the values true or false.

Array: an ordered list of zero or more values, each of which may be of a particular type. Arrays use square bracket notation and elements are comma-separated.

Object: an unordered collection of name-value pairs where the names (also called keys) are strings. Since objects are intended to represent associative arrays. Objects are delimited with curly brackets and use commas to separate each pair, while within each pair the colon ':' character separates the key or name from its value.

null: An empty value, using the word null.

As an example, a person may be represented as follows in the JSON format:

```
{
    "firstName": "John",
    "lastName": "Smith",
    "isAlive": true,
    "age": 27,
    "address": {
        "streetAddress": "21 2nd Street"
        "city": "New York",
        "state": "NY",
        "postalCode": "10021-3100"
    },
    "phoneNumbers": [
```

-continued

```
{
    "type": "home",
    "number": "212 555-1234"
}
}
```

As an example, a dataset descriptor can include generated metadata with details such as, for example, one or more of the following:

- List of column names and their data types;
- List of column names of type Latitude and Longitude to enable spatial indexing and discovery workflows;
- List of columns that will act as primary "key" columns while processing file to enable matching workflows (enrichment);
- List of columns frame of reference information (unit system, dimension, unit of measure, format, etc.);
- List of columns that participate in specialized entity representations, consider an example for a trajectory as follows: columns that will act as Depth, Azimuth and Inclination; and
- Data type mapping block enabling a user to specify how each type of column can be processed by one or more consuming services, such as indexing (for example, "int"→"double") for standardization.

Figure 9:
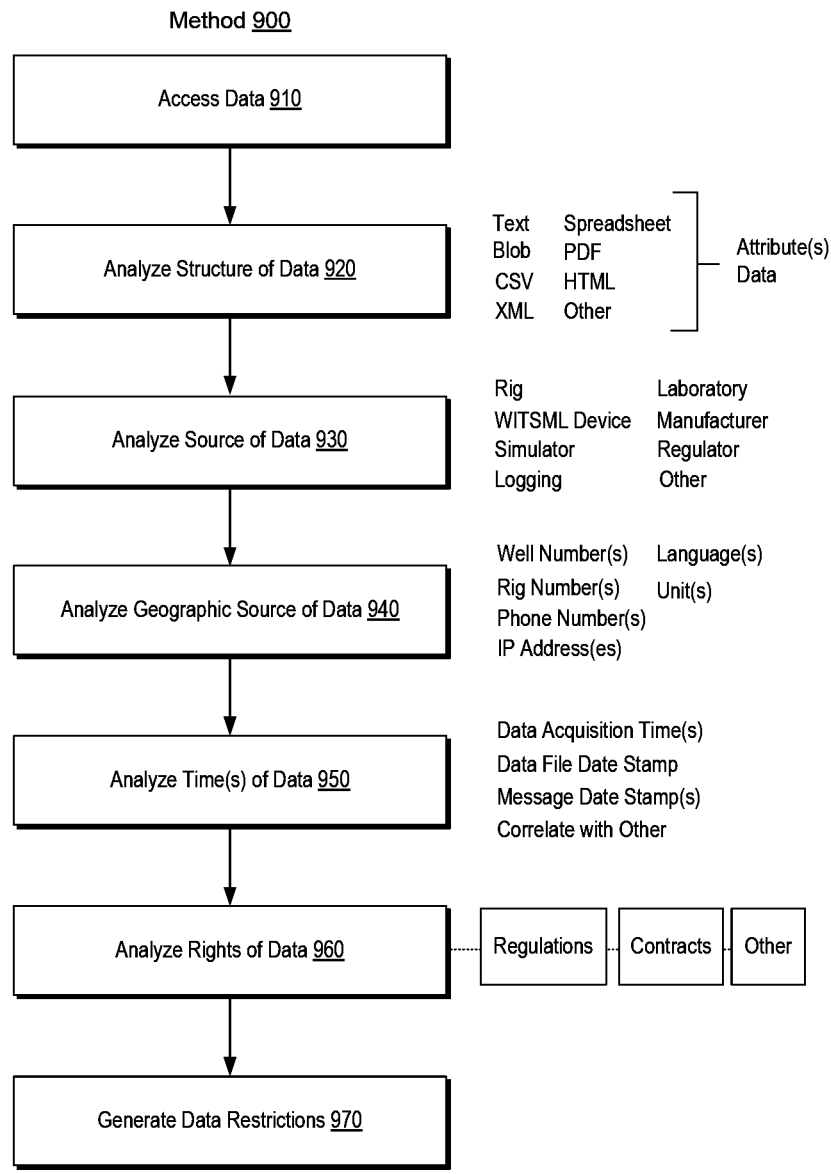
FIG. 9 illustrates an example of a method.

FIG. 9 shows an example of a method 900 that includes an access block 910 for accessing data, an analysis block 920 for analyzing structure(s) of data, an analysis block 930 for analyzing source(s) of data, an analysis block 940 for analyzing geographic source(s) of data, an analysis block 950 for analyzing time(s) of data, an analysis block for analyzing rights of data, and a generation block 970 for generating restrictions for data.

As shown in the example of FIG. 9, the analysis block 920 can include analyzing structures such as text, blob, CSV, XML, spreadsheet, PDF, HTML or other, which can provide for outputting one or more attributes of the data (e.g., data attributes).

As shown in the example of FIG. 9, the analysis block 930 can include analyzing sources such as rig, WITSML device, simulator, logging, laboratory, manufacturer, regulator, or other.

As shown in the example of FIG. 9, the analysis block 940 can include analyzing geographic source using indicia such as well number, rig number, phone number, IP address, language or other.

As shown in the example of FIG. 9, the analysis block 950 can include analyzing time of data using indicia such as data acquisition time, data file date stamp, message date stamp, correlation with other indicia, etc.

As shown in the example of FIG. 9, the analysis block 960 can include analyzing rights of data with respect to regulations, contracts or other types of information. As an example, the block 960 may utilize information generated or identified by one or more of the other blocks of the method 900.

As to the generation block 970, it may generate restrictions on data that can be based on one or more outputs of one or more of the blocks of the method 900. For example, the analysis block 960 can determine what rights apply to data accessed in the access block 910. In such an approach, the generation block 970 may automatically set restrictions such as deletion of data after a certain amount of time, prohibition of data being transmitted to certain IP addresses indicative of a region or country that for which restrictions may apply, issuance of one or more notifications to one or more entities (e.g., corporate, governmental, rights management, etc.) to indicate that accessed data has been processed via an ingestion service or services.

As an example, output from the method 900 may be utilized in the GUI 700 to render geographic information as to the accessed data, which may include indicia of restrictions. For example, a map may be rendered to indicate where are from and where data cannot be utilized (e.g., accessed, stored, etc.). As an example, consider data that cannot be accessed from a country that is on a prohibited country list. In such an example, the method 900 may generate information for utilization by executable instructions that are part of a workspace framework that checks a destination for data or information generated using the data (e.g., simulation results, a well trajectory, etc.) such that those data or information cannot be transmitted to that destination. Such an approach may utilize IP addresses as geolocators. Such an approach may demand a handshake such that a final destination is indicated and checked.

As an example, the generation block 970 may generate restrictions that reside in a backend such as in a cloud platform where the restrictions may be at a project level, a computational framework level, a data level, etc. As an example, data may be from one geographic location and relevant to a project at another geographic location. In such an example, restrictions can exist as to data and data in relationship to a project. For example, a user may be in country X working on a project in country Y where the data are from country Z. It may be that the data are suitable for use in country X but not country Y. In such an example, the generation block 970 may interact with a user's workspace framework to understand aspects of the project, such as the project is for a wellsite in country Y, to thereby prohibit or otherwise restrict the data because they are prohibited from use in country Y. Accordingly, the generation block 970 can implement complex logic using information associated with a user's workspace framework (see, e.g., FIG. 7 and FIG. 8) to make determinations as to restrictions of data accessed for ingestion.

Figure 10:
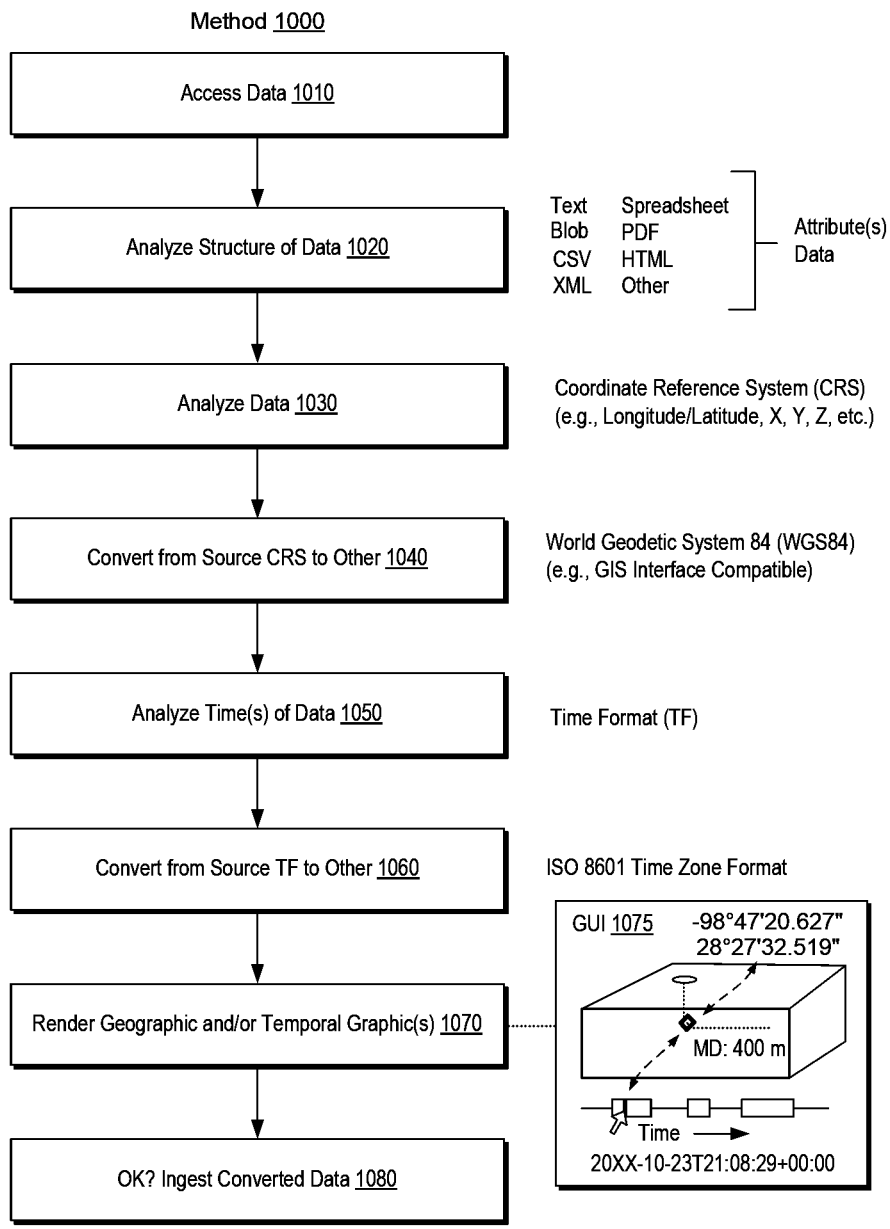
FIG. 10 illustrates an example of a method.

FIG. 10 shows an example of a method 1000 that includes an access block 1010 for accessing data (e.g., via dropping in an intake area of a GUI, via browsing a file system, etc.), an analysis block 1020 for analyzing structure(s) of data, an analysis block 1030 for analyzing data, a conversion block 1040 for converting data from a source coordinate reference system (CRS) to another reference system, an analysis block 1050 for analyzing time(s) of data, a conversion block 1060 for converting a source time format (TF) to another time format (TF), a render block 1070 for rendering geographic and/or temporal graphics associated with the data, and a decision block 1080 for deciding whether the converted data are acceptable for ingestion.

As shown in the example of FIG. 10, the analysis block 1030 can include analyzing data to determine a coordinate reference system (CRS), which may include longitude, latitude, X and Y coordinates, X, Y and Z coordinates, X, Y and time coordinates (e.g., consider seismic data), X, Y and measured depth (MD) coordinates, etc.

As shown in the example of FIG. 10, the conversion block 1040 can include converting from a source CRS to another CRS such as the world geodetic system (WGS) CRS (e.g., consider WGS84). Such an approach may aim to make the data compatible with one or more types of interfaces such as a GIS interface and, for example, a GIS server. Such an approach can facilitate rendering of information associated with data via an area such as the geographic location area 760 of the GUI 700 of FIG. 7.

As shown in the example of FIG. 10, the analysis block 1050 can analyze data to determine a time format (TF) where the conversion block 1060 can optionally convert the data to a different TF. For example, consider a source TF that lacks indicia of time zone. Such an approach may utilize geographic information to ascertain a time zone such that the TF can be converted into a TF such as the ISO 8601 time format.

As shown in the example of FIG. 10, with respect to an example GUI 1075, well data for a horizontal well (e.g., a deviated well) can be rendered using coordinates, which may be surface and/or depth coordinates, along with time, which may be in the ISO 8601 time format. In the GUI 1075, a user may select a block of data on a timeline such that the data are rendered spatially, for example, with respect to the well. Where the data are from a logging operation, data may be acquired during tripping in and/or tripping out of the well. As such, a user may understand that data were acquired during tripping in and/or tripping out as the times can be associated with position of where data were acquired. In such an example, for data acquired while tripping in (e.g., running in hole (RIH)), the spatial indicator will move to greater measured depth (MD) in the well for advancements in time until tripping in data acquisition terminates. Where data are acquired while tripping out (e.g., pulling out of hole (POOH)), further advancement in time can show the spatial indicator progressing to lesser measured depth (MD).

As an example, a user may utilize a GUI such as the GUI 1075 to select particular data spatially and/or temporally. For example, a user may select one of the blocks on the timeline and delete or deselect another and/or a user may select a portion of the well trajectory. In such an approach, a data ingestion service may proceed to ingest data per the user's selection or selections. For example, consider a project that involves determining whether a stimulation treatment is to be applied to a portion of the horizontal well. In such an example, a user may aim to select data that corresponds to that portion of the well at a particular time, which may be before an operation, after an operation, etc. (e.g., consider a prior stimulation operation). The user may then ingest the particular data using a system such as the system 800 of FIG. 8 and proceed with a workflow for the project that aims to determine whether a stimulation treatment can be beneficially applied.

As indicated in the GUI 1075, measured depth (MD) may be rendered. However, MD may not be explicit in data being ingested. For example, data being ingested may include surface location of the well and data from a logging operation that includes times and a movement rate of a logging tool. In such an example, an ingestion service may utilize such times and movement rate to estimate measured depths (MDs) for various portions of the data. As an example, data may indicate a total vertical depth (TVD); however, for a horizontal well, TVD alone can be inadequate for understanding where data are along a length of a horizontal portion of the well. As an example, the GUI 1075 may render TVD and/or other depth related information. As to seismic data, as explained, time can be a proxy for depth. Where the GUI 1075 renders seismic data (e.g., a seismic slice from a seismic cube), time and/or depth may be utilized along with, for example, inline and/or crossline indexes.

An example of a computer program listing appears after the Detailed Description and before the claims, which includes various examples of parameters, attributes, instructions, etc. As an example, processor-executable instructions stored in a non-transitory storage medium or non-transitory storage media can include instructions that access one or more libraries of instructions, that access one or more application programming interfaces, that access one or more computing resources (e.g., local, remote, local and remote), etc. As an example, consider various instructions associated with one or more cloud resources such as "from google.cloud import storage", "from google.appengine.ext import blobstore", etc. As an example, instructions can include ingestor related instructions such as "from ingestor_utilities import constants", "from ingestor_utilities import log", "from ingestor_utilities import errors", etc.

As an example, instructions may be in one or more programming languages. For example, consider the PYTHON language, which includes various methods that may be called and utilized. As an example, consider the "split" method that returns a list of words in a string where using str as a separator (splits on whitespace if left unspecified), optionally limiting the number of splits to num. As another example, consider the "strip" method that returns a copy of a string in which chars have been stripped from the beginning and the end of the string (default whitespace characters).

As an example, one or more programming languages can include support for JSON. For example, in the PYTHON language, an instruction "import json" can provide access to a package called json for encoding and decoding JSON data. The JSON support can facilitate parsing JSON strings and, for example, files that include a JSON object(s). As an example, consider the following PYTHON language code segment that parses a JSON string using the json.loads( ) method to return a dictionary where person is a JSON string, and person_dict is a dictionary:

```
import json
person = '{"name": "Bob", "languages": ["English", "Fench"]}'
person_dict = json.loads(person)
    # Output: {'name': 'Bob', 'languages': ['English', 'Fench']}
print(person_dict)
    # Output: ['English', 'French']
print(person_dict['languages'])
```

As an example, a method can include utilizing a PYTHON language JSON method such as json.dumps( ), which can convert a dictionary to JSON.

As an example, a method can utilize one or more HTTP (Hypertext Transfer Protocol) request methods such as GET and POST. As mentioned, a service may utilize REST and be RESTful. As an example, various methods may be utilized in the PYTHON language. For example, consider using one or more of the following PYTHON language HTTP libraries: httplib, urllib and requests. HTTP is a set of protocols that can provide for client-server types of communication. For example, HTTP can work as a request-response protocol between a client and server. As an example, a web browser may be the client, and an application on a computer that hosts a web site may be the server. To request a response from the server, consider one of the following methods: "GET" to request data from the server and "POST" to submit data to be processed to the server. As an example, where a POST method is expected, code may raise an error and output a message such as "Use POST method!" with a reason such as "Invalid request".

As an example, utilizing instructions in the PYTHON language or other suitable language to output latitude and longitude of a specified known location by sending a GET request to the GOOGLE MAPS application programming interface (API), which can provide access to various the internal feature of the GOOGLE MAPS application. As an example, data returned in response to making an API call may be provided in the JSON format, which may be implemented as dictionary objects in the PYTHON language (see, e.g., "dict").

As an example, a method can include using a programming language method such as the PYTHON language keys ( ) method (e.g., dict.keys( )) to get keys of a dictionary. For example, consider instructions that define a dictionary as follows: dict={'Name': 'Zara', 'Age': 7}. In such an example, the following code can be utilized: print "Value: % s" % dict.keys( ). Execution of the code (e.g., the dict.keys ( ) method) can provide the following result: Value: ['Age', 'Name']. For example, name and age can be attributes with values "Zara" and "7".

As mentioned, a spreadsheet format can include attributes, which may appear in a column that is a leftmost column (e.g., a first column, etc.). For example, consider an example spreadsheet presented as Table 1 below.

TABLE 1

Example spreadsheet data.

| Well Name | Well Number | Depth | Date Drilled |
|---|---|---|---|
| Big Well | 23 | 1255 | 07-07-20XX |

Above, the attribute is "Well Name" and a text entry in that column is "Big Well", which is the well name for the well number 23, with associated depth and date drilled data. As an example, a spreadsheet may be with or without the first row, which may explicitly list one or more attributes. For example, a file can include alphanumeric characters organized in rows, columns, separated with commas, separated with one or more spaces, separated by tabs, etc. With respect to Table 1, a file may include "Big Well", "23", "1255" and "07-07-20XX" (e.g., where 20XX is the year). Such data can provide for automated schema generation. As an example, a service can analyze a dropped file that includes the data of Table 1, which may not include the attribute heading, and heuristically predict a data model and render suggestions to a display, for example, via a GUI for user validation (e.g., confirmation via the GUI). As an example, such a GUI may include graphical controls that enable a user to make adjustments to heuristic detection results and, for example, to explicitly specify one or more other aspects which may be missed by heuristic detection. In the foregoing example, consider a result that indicates "1255" is a measured depth where "Big Well" is a deviated well that is well number "23" in a particular basin where data exists as to latitude and longitude of the well head. A GUI may render a graphic of a map with the well with a perimeter that is at the measured depth "1255" (e.g., maximum possible extent of well from the well head as if the well is horizontal), which may be in feet as determined using the location of the basin (e.g., a US well). Such a graphic can be utilized in conjunction with a graphical control to confirm that the data in the file has been adequately ingested and analyzed with respect to its attributes. As an example, where multidimensional well trajectory data are available, such data may be processed, utilized, etc. Additionally, as the date format can be ambiguous with respect to US and European standards (e.g., as month and date are represented by the same numeral), a graphic can indicate a calendar or other representation to notify a user that the date is being understood to be in a date, month, and year format rather than in a month, date and year format, the latter of which could cause issues for additional files (e.g., for the same basin, etc.) that utilize a generated template. As explained with respect to FIG. 10, particularly the GUI 1075, more complex graphics may be rendered that facilitate review by a user to confirm one or more results, to enter missing information, to edit one or more results, etc.

As an example, a method can include determining a file format and selecting a file reader in response to the determined file format. For example, consider determining that a file has a CSV format and select a file reader such as a csv_reader method. As an example, CSV format can be for a plain text file that uses a character set such as ASCII, various Unicode character sets (e.g. UTF-8), EBCDIC, or Shift JIS; that includes record(s) (e.g., one record per line); that includes records divided into fields separated by delimiters (e.g., a single reserved character such as comma, semicolon, tab, etc., or a space or spaces, etc.); where individual records can be arranged with a common sequence of fields. As to the data in Table 1, consider a file with a record such as: Big Well, 23, 1255, 07-07-20XX. Such a file may include another record, for example, commencing on another line: Small Well, 15, 824, 03-05-20XX. In such an example, a GUI may render graphics for multiple records, which may facilitate review, confirmation, editing, annotating, etc. As an example, a generated template may be saved and utilized for files of the same format as may be from the same source (e.g., type of instrument, type of program, etc.).

Figure 11:
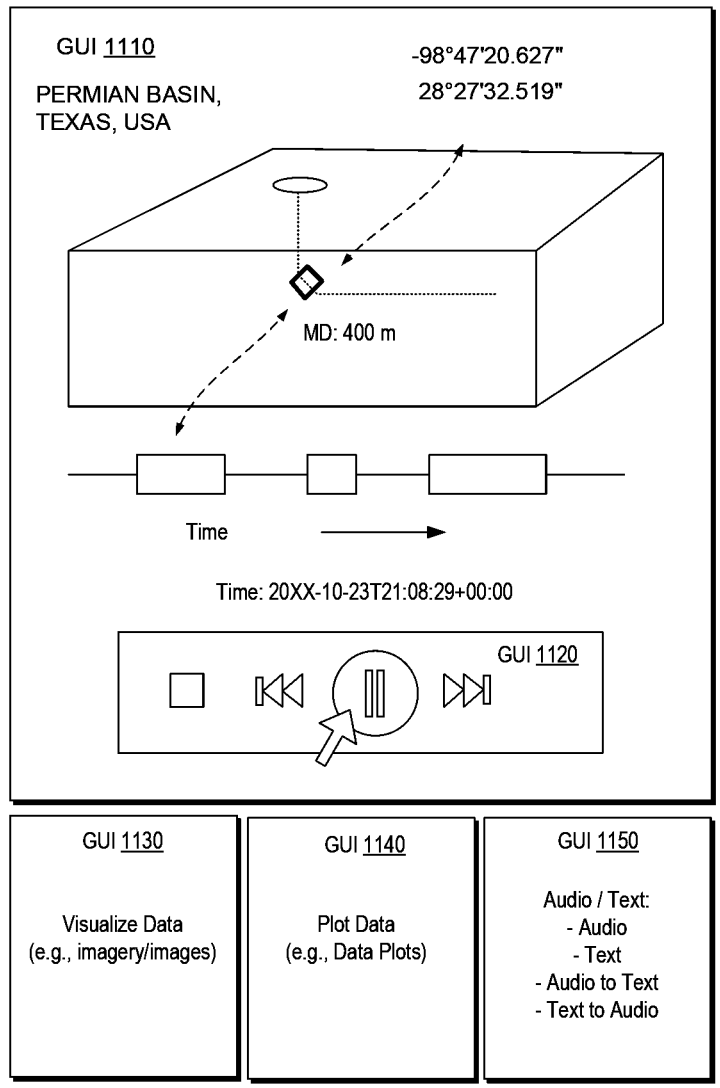
FIG. 11 illustrates an example of a method and examples of graphical user interfaces.

FIG. 11 shows an example of a method 1100 with respect to a GUI 1110, which can be akin to the GUI 1075 of FIG. 10. In FIG. 11, the GUI 1110 includes a GUI 1120 with visualization controls such as stop, rewind, forward, play, pause, etc. Such controls can be linked to time data in data to be ingested. While the example GUI 1110 shows a 3D environment, consider one or more of examples GUIs 1130, 1140 and 1150, which may render one or more other types of environments and/or data. For example, the GUI 1130 can provide for visualization of data (e.g., GIS, borehole imager, etc.), the GUI 1140 can provide for data plots (e.g., logs, which may be associated with a 3D environment), and the GUI 1150 can provide for audio and/or text, which may include audio, text, audio to text or text to audio.

The GUI 1110 can be utilized in the method 1100 where the method 1100 includes rendering information to a display as to data being processed by one or more ingestion services (see, e.g., the GUI 700 of FIG. 7, the system 800 of FIG. 8, etc.). Such an approach can allow a user to understand various aspects of the data to help assure that the desired data is being processed for ingestion as may be associated with a workflow or workflows of a project. As explained, a method such as the method 1000 can be utilized to help assure data are in a form suitable for presentation via a GUI such as the GUI 1110 of FIG. 11.

FIGS. 12, 13, 14, 15, 16 and 17 show some examples of GUIs 1200, 1300, 1400, 1500, 1600 and 1700, which can be rendered using executable instructions (e.g., via a processor, processors, etc.). As an example, one or more of the GUIs 1200, 1300, 1400, 1500, 1600 and 1700 may be renderable using a browser application that executes on a client device that is operatively coupled to one or more networks (e.g., via one or more network interfaces).

In FIG. 12, the GUI 1200 shows various selectable features for heuristically determining data type, format, unit system, dimension, and unit. The GUI 1200 includes attributes that include an American Petroleum Institute (API) number, basin, completion date, measured depth, ground elevation, latitude, longitude, bottom hole pressure, bottom hole temperature, etc. As shown, graphical controls (e.g., check boxes) can be rendered and utilized to select one or more of the attributes. As to a preview for API (i.e., not an application programming interface), an API number may be rendered and as to type, "Number" may be rendered. As to a preview for basin, "Permian" may be rendered, as to type, "Text" may be rendered and as to format, "String" may be rendered. As to a preview for CompletionDate, "19YY-06-22T00:00:00+00:00" may be rendered, as to type, "Date" may be rendered and, as to format, "yyyy-MM-ddTHH:mm:ssZ" may be rendered. As to unit systems, consider "English" as an example. As to dimension, consider "Length", "Pressure", "Temperature", etc.

In FIG. 13, the GUI 1300 shows various selectable features for heuristically determining spatial attributes and enabling a user to micro adjust. As shown, the GUI 1300 includes various geolocation controls, such as "Attribute CRS" with "Axis" and "Source Attribute" with "E/Latitude" and "Format" and "N/Longitude" and "Format". The GUI 1300 can be utilized to enter and/or edit one or more entry. For example, an automated approach may populate various entries and may cause one or more entries to be highlighted where uncertainty exists or where the automate approach cannot make a determination. In FIG. 13, the "Attribute CRS" is populated with "NAD83", which is a CRS that finds use by various federal agencies in the United States. The North American 1983 datum (NAD83) uses the Geodetic Reference System (GRS80) ellipsoid while the World Geodetic System of 1984 (WGS84) uses the WGS 84 ellipsoid. A method that identifies NAD83 may utilize such an identification to indicate that data pertain to a North American region (e.g., a well in North America, etc.). As an example, a method may "zoom-in" on a geographic location as data are processed. For example, consider a global map that first highlights a continent, then a country, followed by a specific location in that country. A rendering to a display of the zooming-in may allow a user to visualize geography as derived from data. In such an example, an inconsistent jump in regions (e.g., from North America to Africa) may indicate that a conflict exists such that some data may not be properly in a dataset. As an example, a GUI may render an indication as to what data appears to be inconsistent, which may optionally be marked for filtering out of the dataset.

In FIG. 14, the GUI 1400 shows various features for explicitly declaring how ingested data relate to other data, which may already be in a data ecosystem. As shown, the GUI 1400 includes various relationship controls, such as "Match From" and "Match To" for attribute, source, entity, etc. For example, consider a well ID being matched to PROSOURCE and a wellbore entity. In the example of FIG. 14, the GUI 1400 can be for geographic relationships (e.g., geolocations, etc.). As shown, a control allows for adding one or more additional relationships.

In FIG. 15, the GUI 1500 shows various features for explicitly declaring how ingested data may be enriched, which may provide for enriching other data. As shown, the GUI 1500 includes various enrichment controls, which can call an enrichment routine and a match rule. As to a match rule, consider an attribute check, which may be per a check box approach as illustrated in the GUI 1500. For example, where two boxes are checked, a match rule may be established for data enrichment.

In FIG. 16, the GUI 1600 shows various features for specifying how ingested data can be visualized in a data ecosystem visualization tool/widget (see, e.g., the GUI 700 of FIG. 7). As shown, various attributes can be rendered along with various visualization-related features (e.g., title, GIS, grid view, card view, fly out view, widget, etc.).

In FIG. 17, the GUI 1700 shows various features for reviewing and confirming the creation of a re-usable template to frictionally ingest data in a manner that appears frictionless to a user and where the ingested data are consumable by one or more computational frameworks. As shown in FIG. 17, the GUI 1700 can render information such as the file added (e.g., ingested), the source, an entity type, a legal tag, and permissions. As shown, a template can have a name (e.g., "Wells"). As shown, a description may be provided in association with a template.

FIGS. 18, 19, 20 and 21 show some examples of GUIs 1800, 1900, 2000 and 2100, which can be rendered using executable instructions (e.g., via a processor, processors, etc.). As an example, one or more of the GUIs 1800, 1900, 2000 and 2100 may be renderable using a browser application that executes on a client device that is operatively coupled to one or more networks (e.g., via one or more network interfaces).

As an example, a dataset descriptor can include schema information, etc., and be created dynamically based on inputs (e.g., from a user, automatically generated by a computer, etc.) and from one or more predictive algorithms.

As an example, consider a server response as to "RequestResponsecURL" using HTTP (e.g., HTTP/1.1) where an "OK" code 200 is generated. In such an example, the following statements may be present: Access-Control-Allow-Credentials: true; Access-Control-Allow-Headers: origin; Access-Control-Allow-Methods: GET; Access-Control-Allow-Origin: *; Alt-Svc: clear; Cache-Control: no-cache; Content-Encoding: gzip; Content-Security-Policy: default-src 'self'; Content-Type: application/json; Date: Tue, XX YYY 20ZZ 16:05:52 GMT; Expires: 0; Server: Jetty (9.4.XX); slb-correlation-id: 7fbd0ca7I mff2d-4a50-b495; Strict-Transport-Security: max-age=31536000; includeSubDomains; Transfer-Encoding: chunked; Vary: Accept-Encoding; Via: 1.1 google; X-Content-Type-Options: nosniff; X-Frame-Options: DENY; X-XSS-Protection: 1; and mode=block.

As an example, a method can include generation of a template that may be expressed in one or more programming languages, computer and/or transport formats, etc.

As an example, consider the server response as generating statements that can specify a template (e.g., that form a template). In such an example, consider the following as to data, which is for a template for markers in CSV format exported from PROSOURCE and presented herein in less than 60 lines:

```
"data": {
    "data_type_mapping": {"date": "datetime", "int": "int", "boolean":
"bool","double":
"double", "datetime": "datetime"},
    "description": "Template for markers in CSV format exported
       from PROSOURCE",
    "data_dictionary": {
        "HeaderRecord": {
            "ID": {"SourceDatatype": "int", "Description":
"ID"},
            "UBHI": {"SourceDatatype": "string",
                "Description": "UBHI"},
            "BOREHOLE_NAME": {"SourceDatatype": "string",
                "Description":
"BOREHOLE_NAME"},
            "INFORMAL_SURFACE_NAME": {"SourceDatatype":
                "string", "Description":
"INFORMAL_SURFACE_NAME"},
```

-continued

```
        "PICK_DEPTH": {"SourceDatatype": "double",
        "Description": "PICK_DEPTH",
"Unit": "ft", "UnitPersistableReference": "foot (international)"},
        "APPLICATION_NAME": {"SourceDatatype":
        "string", "Description":
"APPLICATION_NAME"},
        "INSERT_DATE": {"SourceDatatype": "string",
        "Description": "INSERT_DATE"},
        "INSERT_USER": {"SourceDatatype": "string",
        "Description": "INSERT_USER"},
        "BOREHOLE_ID": {"SourceDatatype": "int",
        "Description": "BOREHOLE_ID"},
        "STRATIGRAPHIC_SURFACE_ID":
        {"SourceDatatype": "int", "Description":
"STRATIGRAPHIC_SURFACE_ID"},
        "REMARKS": {"SourceDatatype": "string",
        "Description": "REMARKS"},
        "SURFACE_NAME": {"SourceDatatype":
        "string", "Description":
"SURFACE_NAME"},
        "INTERPRETER": {"SourceDatatype": "string",
        "Description":"INTERPRETER"},
        "PICK_QUALITY": {"SourceDatatype": "double",
        "Description": PICK_QUALITY"},
        "CONFORMITY_RELATIONSHIP": {"SourceDatatype":
        "string", "Description":
"CONFORMITY_RELATIONSHIP"},
        "POSITION_ID": {"SourceDatatype": "int",
        "Description": "POSITION_ID"},
        "TVD_SS": {"SourceDatatype": "int",
        "Description": "TVD_SS"},
        "SHAPE": {"SourceDatatype": "int",
        "Description": "SHAPE"},
        "ABSOLUTE_X": {"SourceDatatype": "int",
        "Description": "ABSOLUTE_X"},
        "ABSOLUTE_Y": {"SourceDatatype": "int",
        "Description": "ABSOLUTE_Y"},
        "ORIGINAL_COORD_SYSTEM_ID":
        {"SourceDatatype": "int", "Description":
"ORIGINAL_COORD_SYSTEM_ID"},
        "ORIGINAL_COORD_SYSTEM_NAME":
        {"SourceDatatype": "string",
"Description": "ORIGINAL_COORD_SYSTEM_NAME"},
        "ORIGINAL_CRS": {"SourceDatatype": "string",
        "Description": "ORIGINAL_CRS"},
        "ORIGINAL_ABSOLUTE_X": {"SourceDatatype":
        "int","Description":
"ORIGINAL_ABSOLUTE_X"},
        "ORIGINAL_ABSOLUTE_Y": {"SourceDatatype":
        "int", "Description":
"ORIGINAL_ABSOLUTE_Y"},
        "DIP_AZIMUTH": {"SourceDatatype": "int",
        "Description": "DIP_AZIMUTH"},
        "DIP": {"SourceDatatype":
        "int","Description": "DIP"},
        "QC_ATTRIBUTE_ID": {"SourceDatatype":
        "int","Description":
QC_ATTRIBUTE_ID"}
        }
}
```

As shown in the foregoing example, the template includes a "data_type_mapping", a "description" and a "data_dictionary", as well as a "HeaderRecord".

As an example, a field mapping may be included as part of a template such as, for example: "field_mapping": {"marker": {"Record": "HeaderRecord", "id": "{ID}", "references": { }}}

As an example, such a field mapping can include specification for one or more IDs, versions, kinds, viewers, owners, legal (e.g., legal tags), etc. As an example, one or more regions, countries, etc., may be specified (see, e.g., "IN" for India in the example below). As an example, consider the foregoing example template statements as including one or more of:

```
"id": "slb:doc:3127b16e6543435991d82b38a7f41580",
"version": 1560268375147126,
"kind": "slb:generic:marker:1.0.0",
"acl": {"viewers":
["data.default.viewers@slb.p4d.cloud.slb-ds.com"],"owners"
["data.default.owners@slb.p4d.cloud.slb-ds.com"]},
"legal": {"legaltags": ["slb-00b27d94a2be45f0-nimbus-1293"],
"otherRelevantDataCountries": ["IN"],"status": "compliant"}
```

As shown above, pick depth data may be specified or represented by the following: "PICK_DEPTH": {"SourceDatatype": "double", "Description": "PICK_DEPTH", "Unit": "ft", "UnitPersistableReference": "foot (international)"}. In such an example, a source data type is specified as being "double", a description is specified as being "PICK_DEPTH", a unit is specified as being in feet (ft), and a unit persistable reference as being in "foot (international)".

As shown above, cURL may be utilized, which provides a library (libcurl) and command-line tool (curl) for transferring data using various protocols.

As an example, a GUI can provide one or more features to make one or more requests, which may be requests to a server or other computing device, computing system, cloud-resource, etc. As an example, such an approach may utilize one or more technologies to make the request (e.g., consider a HTTP client such as a browser application, cURL, etc. In such an approach, a HTTP request may be issued (e.g., transmitted) to a server where the server responds back with a HTTP response where the response (e.g., "server response") includes information that is responsive to the request. As mentioned, a template generation process may be performed using HTTP where, for example, a request is issued and a response received where the response may be a template that can be utilized directly for ingestion of data, be presented via a GUI for review, be presented via a GUI for one or more modifications (e.g., additions, changes, deletions, etc.).

FIG. 18 shows the GUI 1800 as may be utilized in a method that can create a new template. As shown, a file is selected to be added with a name "ps_markers.csv". The GUI 1800 includes a source field graphic control, an entity field graphic control, a template name field graphic control and a description field graphic control. The template name in the example of FIG. 18 is shown to be "Markers from CSV", which corresponds to the file added being a comma separated values (CSV) file. As to the name of the file, "ps" stands for "PROSOURCE", which is indicated in the description field: "This template is for Markers in CSV format exported from PROSOURCE". Such information may be part of a template, for example, a description of a template having a name as specified in the template name field. The GUI 1800 is shown as including a "Next" graphic control (e.g., a next button), which may be actuated to cause a request to be issued and a response to be received.

FIG. 19 shows the GUI 1900 as listing selectable attributes and corresponding previews, types, formats, unit systems, dimensions and units. In such an example, the information of the GUI 1900, as rendered, can be generated responsive to a request, for example, as issued by actuation of the "Next" graphic control of the GUI 1800. As shown in the GUI 1900, detailed information as to various attributes can be rendered such that a user can review the types of data, format, units, dimensions, etc. For example, an informal surface name is Arbuckle Group, which refers to a group of two or more formations that may share certain lithological characteristics. As another example, Pick_Depth (or PICK_DEPTH) shows a numeric value 1054.608 with dimensions of length and English units of feet.

In the example of FIG. 19, the GUI 1900 can include one or more graphical controls for selection of an entry and for performing one or more actions with respect to the selected entry. For example, consider the Pick_Depth preview, which is 1054.608 feet, and selecting a geographic view, which may be a map view, a 2D view, a 3D view, etc. In such an example, a map may be a location map with surface features, a 2D view may be of a slice of seismic data as a seismic image where the surface "Arbuckle Group" is identified with a depth of the given Pick_Depth. As to a 3D view, consider an Earth model that includes a Cartesian or other coordinate system with the Pick_Depth indicated. As to the GUI 700, the geographic locations area 760 may provide for rendering a map, a 2D view, a 3D view, etc., responsive to interactions with the GUI 1900.

As an example, the GUI 1900 can provide for interactions such that a user may, for example, add, modify, delete, etc., one or more of the listed attributes. As shown, the GUI 1900 includes "Back" and "Next" graphic controls. Where a user reviews and approves of the information (e.g., template information), the "Next" graphic control may be actuated.

FIG. 20 shows the GUI 2000, which is associated with the GUIs 1800 and 1900 for creation of a new template. The GUI 2000 shows the file name, the source (e.g., type of source, etc.), the entity type, the legal tag and permissions as to sharing (e.g., everyone, which may be a default setting). The GUI 2000 includes "Back" and "Create Template" graphic controls. Where a user reviews and approves of the summarized information (e.g., as in one or more GUIs as generated automatically, via editing, etc.), a computing device or system may receive an instruction responsive to actuation of the "Create Template" graphic control such that the template "Markers from CSV" is generated to facilitate data ingestion for utilization of data by one or more computational frameworks.

Figure 21:
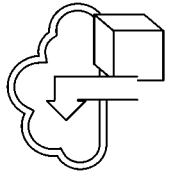
FIG. 21 illustrates an example of a graphical user interface.

FIG. 21 shows the GUI 2100, which may be part of the GUI 700 of FIG. 7 or otherwise accessible via the GUI 700 of FIG. 7. For example, the GUI 2100 includes a file intake area with the text "Drop File here or Browse" where receipt of a selection for "Browse" may provide for accessing one or more data stores (e.g., local, remote, etc.) to select a data file (e.g., ps_markers.csv, etc.).

As shown in the example of FIG. 21, the GUI 2100 is part of an ingestion process, which may be referred to as a file ingestion process. Fields are included in the GUI 2100 for source, entity, template, file name, file size, sharing, legal tags, etc. The GUI 2100 is shown as including an "Upload" graphic control, which may be actuated to issue an instruction that causes upload of a file, which may be a dropped file in the intake area, a selected file via browsing (e.g., navigating to a data store), etc. As an example, upon dropping or selecting a file, the file name field may be automatically populated along with the file size field. As shown in the example of FIG. 21, an "Upload Only" option may be available where a file is uploaded without template related activities. For example, a user may perform a workflow in a manner where template generation occurs after upload of a data file. In such an example, a user may perform a process that uses a GUI such as the GUI 1800 of FIG. 18 for selecting a file and proceeding to generate a template.

The GUI 2100 may include various graphic controls such as, for example, graphic controls for data curation, viewing data, legal tags, entitlements, data catalog(s), a developer portal, a smart search, etc.

As an example, upon receipt of an "upload" instruction, a request to generate a template automatically may be issued and/or an existing template may be applied. As an example, after upload, a GUI may be rendered with information that is available for review, editing, etc. (see, e.g., the GUI 2000 of FIG. 20).

While the GUIs 1800, 1900, 2000 and 2100 illustrate a CSV data file, one or more other types of data files may be utilized. For example, consider a JSON format data file, a LAS 2.0 (Log ASCII Standard) file, a spreadsheet file (e.g., an EXCEL file (Microsoft Corporation, Redmond, Wash.), etc.), a WITSML file, a rescueML file, etc. The LAS type of file was developed for logging data by the Canadian Well Logging Society in 1989 in an effort to standardize organization of digital log curve information. As to the entity field, as an example, where data are wellbore data, a "wellbore" may be entered, generated, selected, etc., as a type of entity.

As an example, a method can include accessing a data file and generating data descriptors for the data file where the data descriptors may be saved as part of a template. In such an example, the template may be utilized in processing data of the data file where the processed data is suitable for use with one or more computational frameworks (see, e.g., the GUI 700 of FIG. 7).

Figure 22:
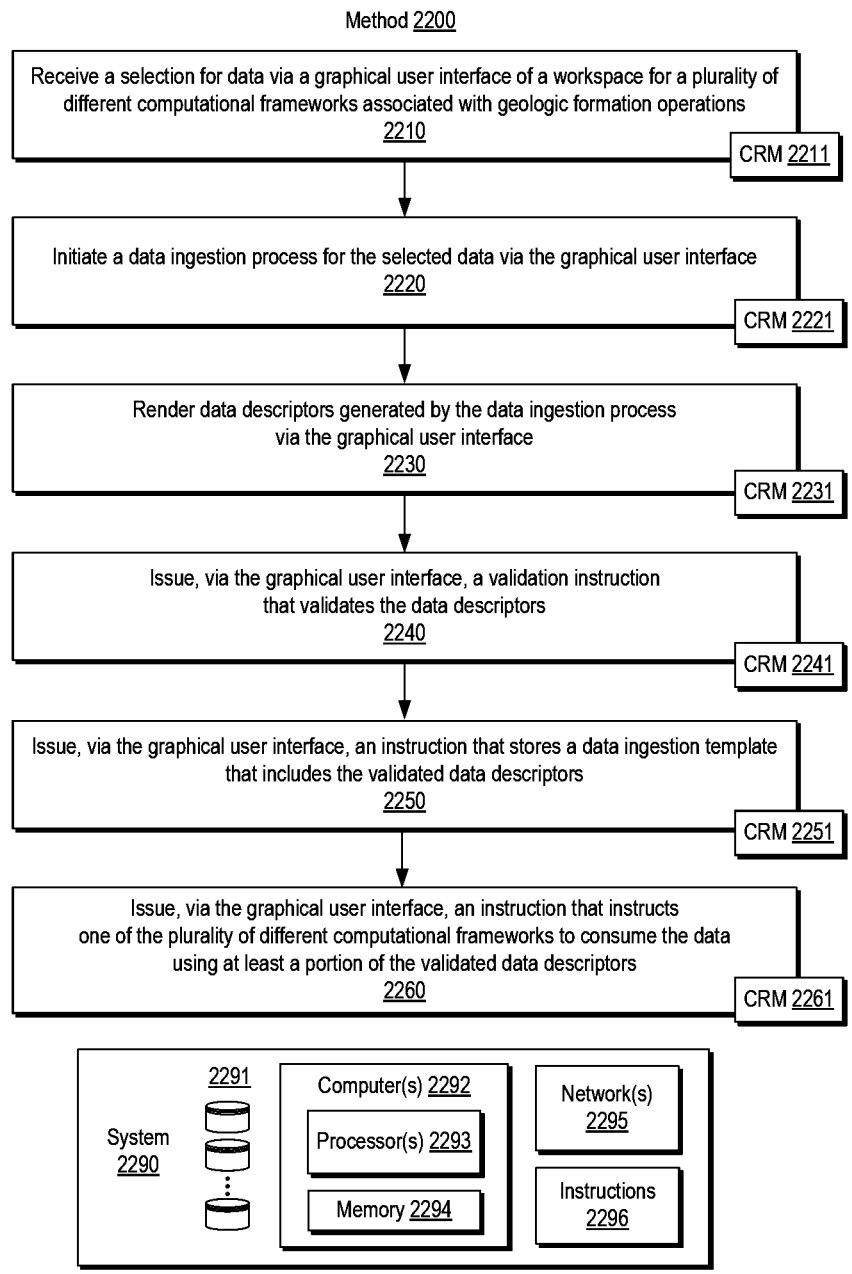
FIG. 22 illustrates an example of a method and an example of a system.

FIG. 22 shows an example of a method 2200 that includes a reception block 2210 for receiving a selection for data via a graphical user interface of a workspace for a plurality of different computational frameworks associated with geologic formation operations; an initiation block 2220 for, via the graphical user interface, initiating a data ingestion process for the selected data; a render block 2230 for, via the graphical user interface, rendering data descriptors generated by the data ingestion process; an issuance block 2240 for, via the graphical user interface, issuing a validation instruction that validates the data descriptors; an issuance block 2250, for, via the graphical user interface, issuing an instruction that stores a data ingestion template that includes the validated data descriptors; and an issuance block 2260, for, via the graphical user interface, issuing an instruction that instructs one of the plurality of different computational frameworks to consume the data using at least a portion of the validated data descriptors, for example, by accessing the stored data ingestion template and using the stored data ingestion template, etc.

The method 2200 is shown as including various computer-readable storage medium (CRM) blocks 2211, 2221, 2231, 2241, 2251 and 2261 that can include processor-executable instructions that can instruct a computing system, which can be a control system, to perform one or more of the actions described with respect to the method 2200.

As shown in the example of FIG. 22, a system 2290 can include one or more computers 2292 that include one or more processors 2293, memory 2294 operatively coupled to at least one of the one or more processors 2293, instructions 2296 that can be, for example, stored in the memory 2294, and one or more interfaces 2295. As an example, the system 2290 can include one or more processor-readable media that include processor-executable instructions executable by at least one of the one or more processors 2293 to cause the system 2290 to perform actions such as, for example, one or more actions of the method 2200. As an example, the instructions 2296 can include instructions of one or more of the CRM blocks 2211, 2221, 2231, 2241, 2251 and 2261. The memory 2294 can be or include the one or more processor-readable media where the processor-executable instructions can be or include instructions. As an example, a processor-readable medium can be a computer-readable storage medium that is non-transitory that is not a signal and that is not a carrier wave.

As an example, one or more of the graphical user interfaces of FIG. 7, 11, 12 to 21 or 23 may be rendered to a display or displays and utilized in performing one or more actions of the method 2200 of FIG. 22. For example, consider the reception block 2210 as implementing the GUI 2100 of FIG. 21 (e.g., for receiving via an "upload"), which may also provide for action of the initiation block 2220 (e.g., initiating responsive to a file icon drag-n-drop, file selection by browsing, etc.); the render block 2230 as implementing the GUI 1900 of FIG. 19; and the issuance block 2250 as implementing the GUI 2000 of FIG. 20 (e.g., for creating the template, which can be stored to memory locally and/or remotely, etc.). As an example, the issuance block 2240 may optionally be combined with the issuance block 2250. For example, consider implementation of the "Create Template" graphical control of the GUI 2000 as being actuatable to cause validation of the data descriptors to provide validated data descriptors and to cause storage of the data ingestion template that includes validated data descriptors. As an example, the issuance block 2240 may implement the "Next" graphical control of the GUI 1900 to cause validation of the rendered data descriptors (e.g., to provide validated data descriptors).

As an example, a method can include selecting a file, parsing the file, rendering data descriptors to a display, editing one or more of the data descriptors, generating a data ingestion template and processing data using the data ingestion template such that the data are usable by one or more computational frameworks.

Figure 23:
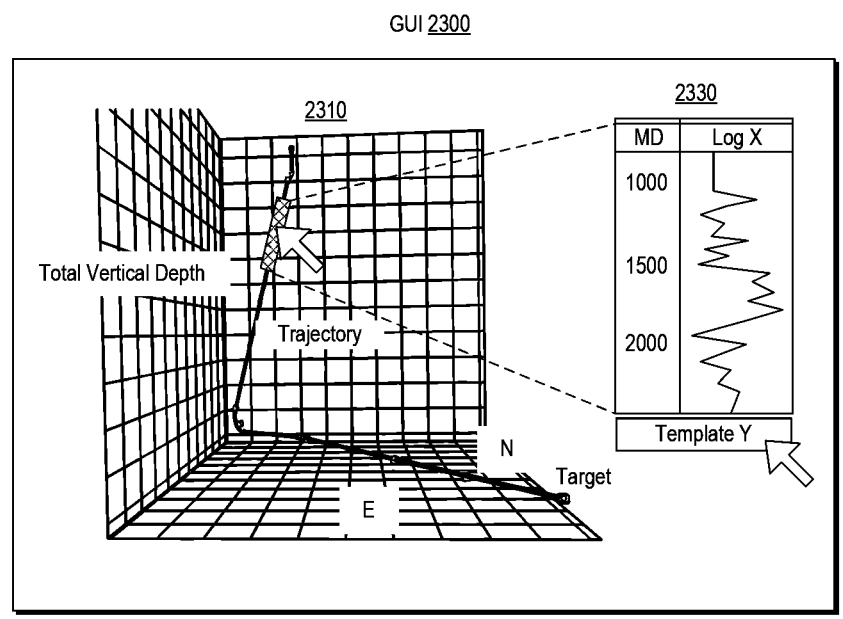
FIG. 23 illustrates an example of a graphical user interface.

FIG. 23 shows an example of a graphical user interface 2300 that includes a visualization rendered by a computational framework that has consumed a portion of ingested data, for example, per the block 2250 of the method 2200 of FIG. 22. For example, consider a computational framework that can be utilized for planning one or more drilling operations where a trajectory can be rendered in a spatial coordinate system of a portion 2310 of the GUI 2300 where drilling of a portion of the trajectory can be planned according log data acquired via a logging operation from an exploratory borehole, an offset well, etc. In such an example, data ingested can be utilized to determine one or more drilling parameters, for example, based on lithology as indicated by logging measurements. As shown, a portion of the trajectory may be highlighted or otherwise indicated as corresponding to ingested data. In such an example, a user may select the portion of the trajectory to generate a view of the ingested data as shown in a portion 2330 of the GUI 2300. Further, a template indicator may be rendered such as "Template Y" where that template corresponds to a template utilized to ingest the data (e.g., Log X data). Such an approach may facilitate ingestion of additional data, if available or when available. For example, if additional data becomes available that is of a similar kind as the Log X data, a user may know a priori that Template Y is suitable for ingestion of that data. In such an example, a user may, via the workspace framework GUI 700 of FIG. 7, drop the new data file in the data intake area 730 and specify use of Template Y to ingest the new data file. For example, the data intake area 730 can include a field to specify a template (see, e.g., "Template?").

As an example, the GUI 2300 can include a graphic control that can operate akin to the data intake area 730. For example, consider a right click on a portion of the trajectory of the project where a user can select data and optionally specify or otherwise select a template to ingest the data for the project.

As an example, a method can include receiving a selection for data via a graphical user interface rendered to a display; via the graphical user interface, initiating a data ingestion process for the selected data; via the graphical user interface, rendering data descriptors generated by the data ingestion process; via the graphical user interface, issuing a validation instruction that validates the data descriptors; and via the graphical user interface, issuing an instruction that stores a data ingestion template that includes the validated data descriptors.

As an example, a data ingestion process can identifies attributes of the data and, for example, store a data ingestion template that includes a plurality of view definitions for rendering visualizations to a display for one or more of the attributes. In such an example, a method can include rendering selectable view definitions to a display for the identified attributes and receiving at least one selection of at least one of the view definitions for at least one of the identified attributes. For example, the GUI 1600 of FIG. 16 shows various view definitions that are selectable on an attribute by attribute basis for identified attributes (e.g., API, well name, completion data, measured depth, ground elevation, latitude, longitude, bottom hole pressure, bottom hole temperature, etc.). As shown in the example GUI 1600, the view definitions include title, GIS, grid view, card view, fly out view WKE widget. As an example, one or more other types of view definitions may be rendered as possible selections. As an example, the drop-down menu in the GUI 1900 labeled "Geo" may be utilized for selecting a view definition for a particular attribute. For example, consider selecting one or more of map, 2D and 3D for a view definition for one or more of the attributes (e.g., as appropriate).

As an example, a data ingestion template may be a collection of configuration files that can be stored in a data storage, which may be a cloud-based storage. For example, consider a cloud-based ingestion process that is operable via a client side graphical user interface where cloud resources access a stored collection of configuration files for purposes of ingesting data for utilization with one or more computational frameworks. As an example, a template generation process can include generating a plurality of configuration files that can be utilized for properly accessing data for use by a computational framework (e.g., PETREL, TECHLOG, etc.), which may be within an environment (e.g., DELFI, etc.). As an example, a data ingestion template may be a file or a collection of files.

As an example, a graphical user interface can be rendered to a display of a workspace for a plurality of different computational frameworks associated with geologic formation operations.

As an example, a method can include issuing an instruction that instructs one of a plurality of different computational frameworks to consume data using at least a portion of validated data descriptors of a data ingestion template. In such an example, the graphical user interface can be a graphical user interface of a workspace for the plurality of different computational frameworks associated with geologic formation operations.

As an example, a method can include receiving one or more selections that adjust one or more rendered data descriptors. As an example, a method can include rendering a graphical control to a display for adjustment of at least one rendered data descriptors where the graphical control includes a menu of items (see, e.g., the example GUI 1900 of FIG. 19). In such an example, the menu of items can include one or more of a geographic rendering item (e.g., a view definition, a rendering action, etc.), a data type item, a data unit system item, a data dimension item, and a data unit item.

As an example, a method can include generating data descriptors by a data ingestion process where at least one converted data descriptor is converted from at least one data descriptor in selected data. For example, consider at least one converted data descriptor that is a geographic location data descriptor or a time data descriptor (e.g., converted from one CRS to another, from one time format to another, etc.). As an example, a conversion may be based on identification of a particular type of data in a particular format (e.g., NAS83, etc.), which can indicate a likely geographic region for the data or an entire dataset. In such an example, if a conflict is found, a notification may be issued such that data review may occur in an effort to resolve the conflict (e.g., rendering conflicting data, filtering out conflicting data, etc.).

As an example, a method can include rendering data descriptors, for example, by rendering a map and one or more locations specified by one of the data descriptors.

As an example, a method can include rendering data descriptors, for example, by rendering a timeline and one or more times specified by one of the data descriptors.

As an example, a method can include receiving a selection for data that is responsive to receipt of a file icon in a drop file area of the graphical user interface. For example, consider dragging and dropping a file icon using a mouse or other human interface device (HID) to position the file icon in a drop file area of a GUI. As an example, a dropping of a file icon in a drop file area may actuate an upload graphical control (e.g., an upload button) and/or may automatically cause an upload to occur.

As an example, a method can include utilizing a data ingestion process that generates a reusable data ingestion template. For example, consider a set of data of a particular type of data (e.g., logging data, seismic data, surface imagery data, etc.) that is ingested and a template generated and stored. In such an example, the template can be reusable for ingestion of another set of data of that particular type.

As an example, a method can include implementing a data ingestion process decrypts data. For example, consider a key-based encryption approach where an ingestion process accesses a key for use in decrypting encrypted data. As an example, an upload process may determine whether data are encrypted and whether a key is available and/or render a GUI to a display for entry of a key, selection of a key, etc.

As an example, a method can include implementing a data ingestion process that restricts at least a portion of data on at least one of geographic location of the data, geographic location of a storage device of the data, geographic location of a graphical user interface utilized in an attempt to ingest the data, and geographic location of equipment associated with a project of a workspace (e.g., a framework project, etc.).

As an example, a method can include ingesting data that are wellbore data in a comma separated value data format and can include accessing other wellbore data in the comma separate value (CSV) data format and ingesting the other wellbore data utilizing the stored data ingestion template. While CSV is mentioned one or more other types of formats may be utilized (e.g., MICROSOFT EXCEL format, JSON format, WITSML format, etc.).

As an example, a system can include a processor; memory accessible to the processor; processor-executable instructions stored in the memory and executable by the processor to instruct the system to: receive a selection for data via a graphical user interface rendered to a display; initiate a data ingestion process for the selected data; render data descriptors generated by the data ingestion process; receive a validation instruction that validates the data descriptors; and store a data ingestion template that includes the validated data descriptors.

As an example, one or more computer-readable storage media can include computer-executable instructions executable to instruct a computing system to: receive a selection for data via a graphical user interface rendered to a display; initiate a data ingestion process for the selected data; render data descriptors generated by the data ingestion process; receive a validation instruction that validates the data descriptors; and store a data ingestion template that includes the validated data descriptors.

Figure 24:
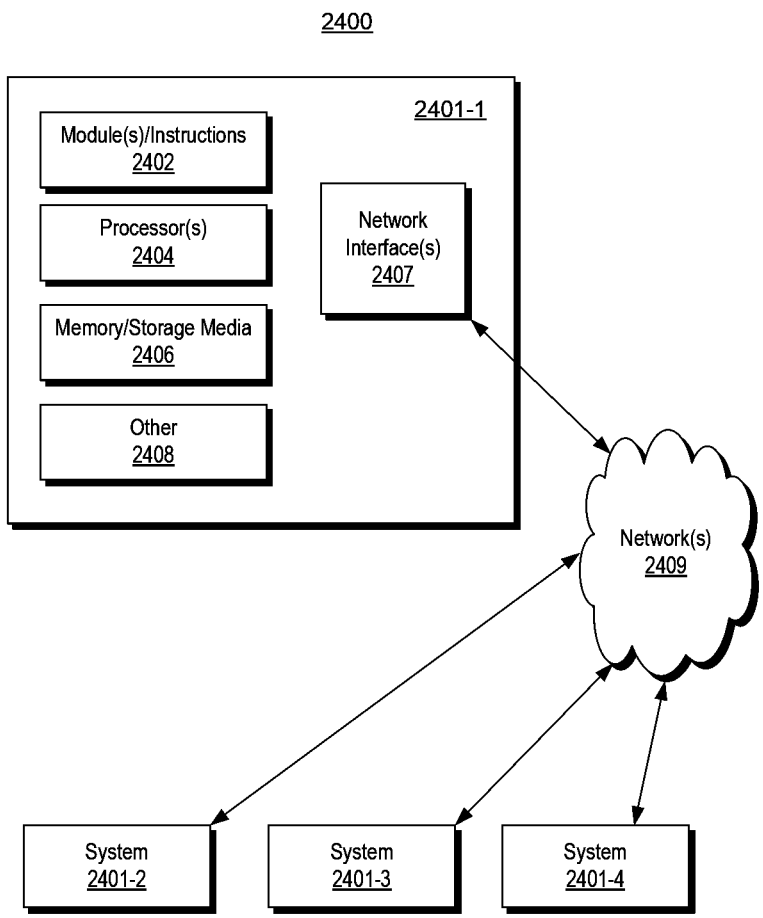
FIG. 24 illustrates examples of computing and networking equipment.

In some embodiments, a method or methods may be executed by a computing system. FIG. 24 shows an example of a system 2400 that can include one or more computing systems 2401-1, 2401-2, 2401-3 and 2401-4, which may be operatively coupled via one or more networks 2409, which may include wired and/or wireless networks.

As an example, a system can include an individual computer system or an arrangement of distributed computer systems. In the example of FIG. 24, the computer system 2401-1 can include one or more modules 2402, which may be or include processor-executable instructions, for example, executable to perform various tasks (e.g., receiving information, requesting information, processing information, simulation, outputting information, etc.).

As an example, a module may be executed independently, or in coordination with, one or more processors 2404, which is (or are) operatively coupled to one or more storage media 2406 (e.g., via wire, wirelessly, etc.). As an example, one or more of the one or more processors 2404 can be operatively coupled to at least one of one or more network interface 2407. In such an example, the computer system 2401-1 can transmit and/or receive information, for example, via the one or more networks 2409 (e.g., consider one or more of the Internet, a private network, a cellular network, a satellite network, etc.).

As an example, the computer system 2401-1 may receive from and/or transmit information to one or more other devices, which may be or include, for example, one or more of the computer systems 2401-2, etc. A device may be located in a physical location that differs from that of the computer system 2401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 25:
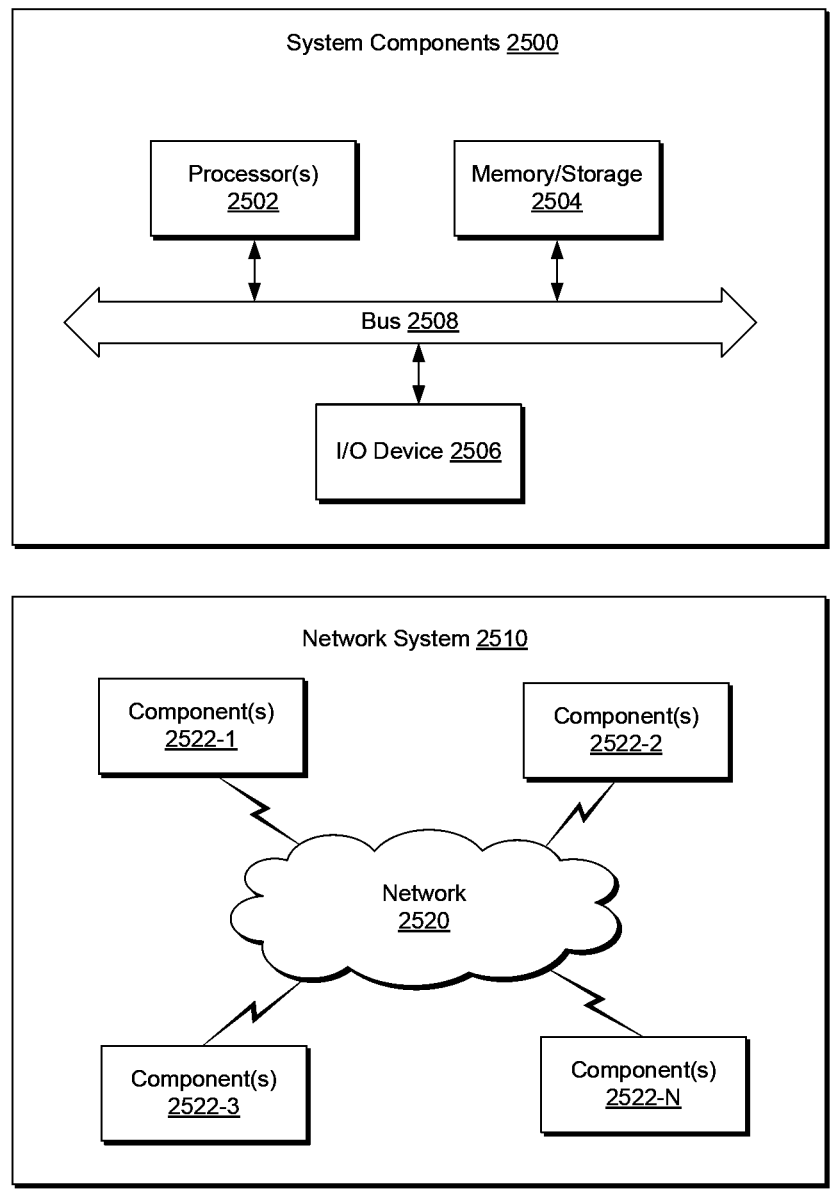
FIG. 25 illustrates example components of a system and a networked system.

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

Example Computer Program Listing

Below, an example of a computer program listing is presented with various examples of parameters, attributes, instructions, etc., where the number of lines is more than 60 lines and less than 300 lines.

```
from flask import render_template
import unicodecsv
import re
from dateutil.parser import parse
import json
import random
import codecs
from google.cloud import storage
from google.appengine.ext import blobstore
from ingestor_utilities import constants
from ingestor_utilities import log
```

```
from ingestor_utilities import errors
from StringIO import StringIO
def readInputParameter(request):# read_input_parameter
    if request.method == 'POST':
        if request.json: params = request.json
        else:
            params = request.form
            logging.info(request.form.get('userEmail'))
    else:
        raise errors.BadException(message="Use POST method!", reason="Invalid
request")
    latitude_val = params.get('latitude')
    longitude_val = params.get('longitude')
    key_column_val = params.get('keyColumn')
    meter_unit_columns_val = params.get('meterUnitColumns')
    ft_unit_columns_val = params.get('ftUnitcolumns')
    org_reference_val = params.get('references')
    context = dict(
        kind=params.get('kind', "").strip( ),
        ddName=params.get('ddName', "").strip( ),
        acl=params.get('acl', ""),
        legal=params.get('legal', ""),
        fieldMappingName=params.get('fieldMappingName', "").strip( ),
        dataTypeName=params.get('dataTypeName', "").strip( ),
        latitudeVal=latitude_val,
        latitude=params.get('latitude').split(",") if params.get('latitude') else "",
        longitudeVal=longitude_val,
        longitude=params.get('longitude').split(",") if params.get('longitude') else "",
        CRSPersistableReference=params.get('CRSPersistableReference', ""),
        keyColumn=params.get('keyColumn').split(",") if params.get('keyColumn') else
"",
        keyColumnVal=key_column_val,
        meterUnitColumns=params.get('meterUnitColumns').split(",") if
params.get('meterUnitColumns') else "",
        meterUnitColumnsVal=meter_unit_columns_val,
        unitPersistableReferenceMeter=params.get('unitPersistableReferenceMeter',
""),
        ftUnitcolumns=params.get('ftUnitcolumns').split(",") if
params.get('ftUnitcolumns') else "",
        ftUnitcolumnsVal=ft_unit_columns_val,
        unitPersistableReferenceFt=params.get('unitPersistableReferenceFt', ""),
        orgReference=params.get('references').split(",") if params.get('references') else
"",
        orgReferenceVal=org_reference_val,
        description=params.get('description'),
        scanRows=params.get('scanRows') if params.get('scanRows') else 1000
    )
    return context
def validateParam(request, context):
    if not request.json:
        try: json.loads(context['acl'])
        except ValueError, e: return "Invalid JSON format of ACL"
        try: json.loads(context['legal'])
        except ValueError, e: return "Invalid JSON format of Legal"
    if context.get('latitude') and context.get('longitude'):
        if (not ((context['latitude'][0].strip( ) != "" and context['longitude'][0].strip( ) != "" and
context['CRSPersistableReference'].strip( ) != "")
                or (context['latitude'][0].strip( ) == "" and context['longitude'][0].strip( ) == ""
and context['CRSPersistableReference'].strip( ) == ""))):
            return "Please provide those for Lat, Long and CRS Attribute"
    if context.get('meterUnitColumns'):
        if (not ((context['meterUnitColumns'][0].strip( ) != "" and
context['unitPersistableReferenceMeter'].strip( ) != "")
                or (context['meterUnitColumns'][0].strip( ) == "" and
context['unitPersistableReferenceMeter'].strip( ) == ""))):
            return "Provide those for Meter unit columns and Unit Pers Ref. for Meter"
    if context.get('ftUnitcolumns'):
        if (not ((context['ftUnitcolumns'][0].strip( ) != "" and
context['unitPersistableReferenceFt'].strip( ) != "")
                or (context['ftUnitcolumns'][0].strip( ) == "" and
context['unitPersistableReferenceFt'].strip( ) == ""))):
            return "Provide those for Ft. unit columns and Unit Pers Ref. for Ft."
def validateColumnNames(context, **data_dict):
    if context.get('latitude'):
        if context['latitude'] and context['latitude'][0].strip( ) != "":
            for lat in context['latitude']:
                if lat.strip( ) not in [keys.strip( ) for keys in data_dict.keys( )]:
                    return "One of the Latitude column name not present in source data"
    if context.get('longitude'):
```

```
            if context['longitude'] and context['longitude'][0].strip( ) != "":
                for long1 in context['longitude']:
                    if long1.strip( ) not in [keys.strip( ) for keys in data_dict.keys( )]:
                        return "One of the Longitude column name not present in source data"
        if context.get('orgReference'):
            if context['orgReference'][0]:
                for ref in context['orgReference']:
                    if ref.split(":")[1].strip( ) not in [keys.strip( ) for keys in data_dict.keys( )]:
                        return "One of the references column name not present in source data"
        if context.get('meterUnitColumns'):
            if context['meterUnitColumns'] and context['meterUnitColumns'][0].strip( ) != "":
                for metcol in context['meterUnitColumns']:
                    if metcol.strip( ) not in [keys.strip( ) for keys in data_dict.keys( )]:
                        return "Some cols in Meter unit columns not present in source data"
        if context.get('ftUnitcolumns'):
            if context['ftUnitcolumns'] and context['ftUnitcolumns'][0].strip( ) != "":
                for ftcol in context['ftUnitcolumns']:
                    if ftcol.strip( ) not in [keys.strip( ) for keys in data_dict.keys( )]:
                        return "Some cols in Ft unit columns are not present in source data"
        if context.get('keyColumn'):
            if context['keyColumn']:
                for keyCol in context['keyColumn']:
                    if keyCol.strip( ) not in [keys.strip( ) for keys in data_dict.keys( )]:
                        return "Some cols in Key column Name are not present in source data"
def setWarnings(data_columns, context):
    warnings = "- For datetime columns standard ISO 8601 format \"%Y-%m-%dT%H:%M:%SZ\" is considered. " \
                                    * * *
    for m in data_columns:
        for n in data_columns[m]:
            # print(m, n, dataColumns[m][n])
            if (n == "SourceDatatype") and (m in context['latitude'] or m in context['longitude']) and data_columns[m][n] != "double":
                warnings += "- Expected datatype of " + m + " is double but " + data_columns[m][n] + " found. CRSPersistableReference not consider for column\n"
            if (n == "SourceDatatype") and (m in context['meterUnitColumns'] or m in context['ftUnitcolumns']) and data_columns[m][n] != "double":
                warnings += "- Expected datatype of " + m + " is double but " + data_columns[m][n] + " found. UnitPersistableReference not consider for column\n"
            if (n == "SourceDatatype") and (m in context['keyColumn']) and data_columns[m][n] not in ["int", "string"]:
                warnings += "- Expected datatype of " + m + " is int or string as its key column but " + data_columns[m][n] + " found. Data loading might fail\n"
    return warnings
def getCSVReader(request):
    if request.json:
        source_file_path = request.json['sourceFilePath']
        bucketname = source_file_path.split('/', 2)[1]
        filename = source_file_path.split('/', 2)[2]
        if constants.EXTERNAL_HOST: # can run on cloud
            blob_key = blobstore.create_gs_key("/gs" + source_file_path)
            csv_reader = blobstore.BlobReader(blob_key)
                                    * * *
                csv_reader.seek(offset=0, whence=0)
            else: log.info("detected UTF-8 BOM and skipped it")
        else:
                                    * * *
                csv_reader = StringIO(csv_blob_content)
            else: print("detected UTF-8 BOM and skipped it")
    else:
        csv_reader = request.files['file']
        first_bytes = csv_reader.read(3)
        if first_bytes != codecs.BOM_UTF8:
            csv_reader.seek(0)
        else:
            logging.info("Found and skipped BOM characters")
    return unicodecsv.DictReader(csv_reader, encoding='utf-8', errors='ignore')
def getJSONReader(request):
    if request.json:
        source_file_path = request.json['sourceFilePath']
        bucketname = source_file_path.split('/', 2)[1]
        filename = source_file_path.split('/', 2)[2]
        if constants.EXTERNAL_HOST: # can run on cloud
            blob_key = blobstore.create_gs_key("/gs" + source_file_path)
            reader = blobstore.BlobReader(blob_key)
        else:
                                    * * *
    else:
        json_reader = request.files['file']
```

```
            reader = [json.loads(str(item)) for item in json_reader]
        return reader
def generateDD(request):
    context = readInputParameter(request)
    references = { }
    if context.get('orgReference') and context['orgReference'][0]:
        for ref in context['orgReference']:
            references[ref.split(":")[0]] = "{" + ref.split(":")[1] + "}"
        entity_attr["Record"] = context['dataTypeName']
    validate_resp = validateParam(request, context)
    if validate_resp:
        response_msg["message"] = validate_resp
        context.update(text=response_msg["message"])
        return json.dumps(response_msg) if request.json else
render_template('upload.html', **context)
    if context.get('latitude') and context.get('longitude'):
        if context['latitude'][0] and context['longitude'][0] and
context['CRSPersistableReference'].strip( ):
            entity_attr["latitude"] = context['latitude'][0].strip( )
            entity_attr["longitude"] = context['longitude'][0].strip( )
            entity_attr["CRSPersistableReference"] =
context['CRSPersistableReference'].strip( )
    formatted_key_column = ""
    for keyCol in context['keyColumn']:
        formatted_key_column = formatted_key_column + "{" + keyCol.strip( ) + "}"
    entity_attr["id"] = formatted_key_column
    if references:
        entity_attr["references"] = references
    entity_block[context['fieldMappingName']] = entity_attr
                            * * *
    if request.json:
        source_file_path = request.json['sourceFilePath']
        filename = source_file_path.split('/', 2)[2]
        if filename.endswith('.csv'):
            reader = getCSVReader(request)
        elif filename.endswith('.json'):
            reader = getJSONReader(request)
        else:
                            * * *
    for data_dict in reader:
        if counter == 0:
            validate_column_name_response = validateColumnNames(context,
**data_dict)
            if validate_column_name_response:
                response_msg["message"] = validate_column_name_response
                context.update(text=response_msg["message"])
                return json.dumps(response_msg) if request.json else
render_template('upload.html', **context)
        for x in data_dict.keys( ):
            org_key = x
            if isinstance(data_dict[org_key], basestring):
                key_value = data_dict[org_key].encode('ascii', 'ignore').decode('ascii')
            else:
                key_value = str(data_dict[org_key])
            x = x.strip( )
            if re.match("^(true|false|1|0)$", key_value, re.IGNORECASE):
                if x not in output_dict or output_dict[x] in ["empty"]:
                    output_dict[x] = "boolean"
                    data_columns[x] = {"SourceDatatype": "boolean", "Description": x}
            elif re.match("^[-+]?[0-9]+$", key_value):
                if x not in output_dict or output_dict[x] in ["boolean", "empty"]:
                    output_dict[x] = "int"
                    data_columns[x] = {"SourceDatatype": "int", "Description": x}
            elif re.match(r'^[-+]?[0-9]*\.[0-9]+$', key_value):
                if x not in output_dict or output_dict[x] in ["boolean", "int", "empty"]:
                    output_dict[x] = "double"
                    if x in [cols.strip( ) for cols in context['latitude']] or x in [cols.strip( ) for cols
in
                                            context['longitude']]:
                        data_columns[x] = {"SourceDatatype": "double", "Description": x,
                                "CRSPersistableReference":
context['CRSPersistableReference']}
                    elif x in [cols.strip( ) for cols in context['meterUnitColumns']]:
                        data_columns[x] = {"SourceDatatype": "double", "Description": x,
"Unit": "Meter", "UnitPersistableReference":
context['unitPersistableReferenceMeter']}
                    elif x in [cols.strip( ) for cols in context['ftUnitcolumns']]:
                        data_columns[x] = {"SourceDatatype": "double", "Description": x, "Unit":
"ft",
```

```
            "UnitPersistableReference": context['unitPersistableReferenceFt']}
                else:
                            data_columns[x] = {"SourceDatatype": "double", "Description": x}
                else:
                    try:
                        if key_value:
                            parse(key_value)
                            if x not in output_dict or output_dict[x] in ["empty"]:
                                output_dict[x] = "datetime"
                                data_columns[x] = {"SourceDatatype": "datetime", "Description": x,
                                            "DateFormat": "%Y-%m-%dT%H:%M:%SZ"}
                        else: # blank value
                            if x not in output_dict: # or output_dict[x] in ["boolean", "int", "double",
"datetime"]:
                                output_dict[x] = "empty"
                                data_columns[x] = {"SourceDatatype": "string", "Description": x}
                    except Exception as e:
                        if x not in output_dict or output_dict[x] in ["boolean", "int", "double",
"datetime", "empty"]:
                                output_dict[x] = "string"
                                data_columns[x] = {"SourceDatatype": "string", "Description": x}
            counter += 1
            if counter == int(context['scanRows']):
                break
    warnings = setWarnings(data_columns, context)
    record_attr[context['dataTypeName']] = data_columns
    data_block["data"]["data_dictionary"] = record_attr
    data_block["data"]["description"] = context['description']
    data_block["id"] = "{ }:{ }:{ }-{ }-{ }".format(context['kind'].split(":")[0],
context['kind'].split(":")[1],
                                    context['kind'].split(":")[2], context['ddName'],
                                    str(random.randint(9000000, 9999999))))
    data_block["kind"] = context['kind']
    if request.json:
        data_block["acl"] = context['acl']
        data_block["legal"] = context['legal']
    else:
        data_block["acl"] = json.loads(context['acl'])
        data_block["legal"] = json.loads(context['legal'])
    logging.info("Success")
    context.update(text=json.dumps(data_block))
    context.update(warnings=warnings)
    if request.json:
        return data_block
                        * * *
```

What is claimed is:

1. A method comprising:
receiving a selection for data via a graphical user interface rendered to a display;
via the graphical user interface, initiating a data ingestion process for the selected data;
via the graphical user interface, rendering data descriptors generated by the data ingestion process;
via the graphical user interface, issuing a validation instruction that validates the data descriptors; and
via the graphical user interface, issuing an instruction that stores a data ingestion template that comprises the validated data descriptors.

2. The method of claim 1 wherein the data ingestion process identifies attributes of the data and wherein the stored data ingestion template comprises a plurality of view definitions for rendering visualizations to a display for one or more of the attributes.

3. The method of claim 2 comprising rendering selectable view definitions to the display for the identified attributes and receiving at least one selection of at least one of the view definitions for at least one of the identified attributes.

4. The method of claim 1 wherein the graphical user interface is a graphical user interface of a workspace for a plurality of different computational frameworks associated with geologic formation operations.

5. The method of claim 1 comprising issuing an instruction that instructs one of a plurality of different computational frameworks to consume the data using at least a portion of the validated data descriptors of the data ingestion template.

6. The method of claim 5 wherein the graphical user interface is a graphical user interface of a workspace for the plurality of different computational frameworks associated with geologic formation operations.

7. The method of claim 1 comprising receiving one or more selections that adjust one or more of the rendered data descriptors.

8. The method of claim 1 comprising rendering a graphical control to the display for adjustment of at least one of the rendered data descriptors wherein the graphical control comprises a menu of items.

9. The method of claim 8 wherein the menu of items comprises one or more of a geographic rendering item, a data type item, a data unit system item, a data dimension item, and a data unit item.

10. The method of claim 1 wherein the data descriptors generated by the data ingestion process comprise at least one converted data descriptor that is converted from at least one data descriptor in the selected data.

11. The method of claim 10 wherein the at least one converted data descriptor comprises a geographic location data descriptor or a time data descriptor.

12. The method of claim 1 wherein the rendering data descriptors comprises rendering a map and one or more locations specified by one of the data descriptors.

13. The method of claim 1 wherein the rendering data descriptors comprises rendering a timeline and one or more times specified by one of the data descriptors.

14. The method of claim 1 wherein receiving a selection for data is responsive to receipt of a file icon in a drop file area of the graphical user interface.

15. The method of claim 1 wherein the data ingestion process generates a reusable data ingestion template.

16. The method of claim 1 wherein the data ingestion process decrypts the data.

17. The method of claim 1 wherein the data ingestion process restricts at least a portion of the data on at least one of geographic location of the data, geographic location of a storage device of the data, geographic location of the graphical user interface, and geographic location of equipment associated with a project of the workspace.

18. The method of claim 1 wherein the data comprise wellbore data in a comma separated value data format and comprising accessing other wellbore data in the comma separate value data format and ingesting the other wellbore data utilizing the stored data ingestion template.

19. A system comprising:
a processor;
memory accessible to the processor;
processor-executable instructions stored in the memory and executable by the processor to instruct the system to:
receive a selection for data via a graphical user interface rendered to a display;
initiate a data ingestion process for the selected data;
render data descriptors generated by the data ingestion process;
receive a validation instruction that validates the data descriptors; and
store a data ingestion template that comprises the validated data descriptors.

20. One or more computer-readable storage media comprising computer-executable instructions executable to instruct a computing system to:
receive a selection for data via a graphical user interface rendered to a display;
initiate a data ingestion process for the selected data;
render data descriptors generated by the data ingestion process;
receive a validation instruction that validates the data descriptors; and
store a data ingestion template that comprises the validated data descriptors.

* * * * *